(12) United States Patent
Bleyer et al.

(10) Patent No.: US 11,176,744 B2
(45) Date of Patent: Nov. 16, 2021

(54) MAPPING SENSOR DATA USING A MIXED-REALITY CLOUD

(71) Applicant: MICROSOFT TECHNOLOGY LICENSING, LLC, Redmond, WA (US)

(72) Inventors: Michael Bleyer, Seattle, WA (US); Yuri Pekelny, Seattle, WA (US); Raymond Kirk Price, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/517,976

(22) Filed: Jul. 22, 2019

(65) Prior Publication Data
US 2021/0027538 A1    Jan. 28, 2021

(51) Int. Cl.
| | | |
|---|---|---|
| *G06T 19/00* | (2011.01) |
| *G06T 7/70* | (2017.01) |
| *H04W 4/029* | (2018.01) |
| *G06F 16/58* | (2019.01) |
| *G02B 27/01* | (2006.01) |
| *G06K 9/00* | (2006.01) |
| *H04W 4/021* | (2018.01) |

(52) U.S. Cl.
CPC ........ *G06T 19/006* (2013.01); *G02B 27/0101* (2013.01); *G06F 16/5866* (2019.01); *G06K 9/00671* (2013.01); *G06T 7/70* (2017.01); *H04W 4/021* (2013.01); *H04W 4/029* (2018.02); *G02B 2027/0141* (2013.01)

(58) Field of Classification Search
None
See application file for complete search history.

(56) References Cited

U.S. PATENT DOCUMENTS

| | | | |
|---|---|---|---|
| 8,952,799 B2* | 2/2015 | Irrgang | B60W 50/14 340/435 |
| 9,968,018 B2* | 5/2018 | Feri | H04L 12/56 |

(Continued)

FOREIGN PATENT DOCUMENTS

WO    2018090060 A1    5/2018

OTHER PUBLICATIONS

"International Search Report & Written Opinion issued in PCT Application No. PCT/US2020/036810", dated Sep. 10, 2020, 30 Pages.

*Primary Examiner* — Saptarshi Mazumder
(74) *Attorney, Agent, or Firm* — Workman Nydegger

(57) ABSTRACT

Improved techniques for re-localizing Internet-of-Things (IOT) devices are disclosed herein. Sensor data digitally representing one or more condition(s) monitored by an IOT device is received. In response, a sensor readings map is accessed, where this map is associated with the IOT device. The map also digitally represents the IOT device's environment and includes data representative of a location of the IOT device within the environment. The map also includes data representative of the conditions monitored by the IOT device. Additionally, the map is updated by attaching the sensor data to the map. In some cases, a coverage map can also be computed. Both the sensors readings map and the coverage map can be automatically updated in response to the TOT device being re-localized.

20 Claims, 21 Drawing Sheets

(56) References Cited

U.S. PATENT DOCUMENTS

| | | | |
|---|---|---|---|
| 2008/0133190 A1* | 6/2008 | Peretz | G06Q 10/043 703/6 |
| 2015/0061859 A1* | 3/2015 | Matsuoka | G08B 27/00 340/501 |
| 2015/0358777 A1* | 12/2015 | Gupta | H04W 4/023 370/254 |
| 2017/0076015 A1* | 3/2017 | Patel | G06F 30/18 |
| 2017/0105095 A1* | 4/2017 | Um | H04W 4/70 |
| 2017/0280279 A1* | 9/2017 | Ghosh | H04W 4/029 |
| 2018/0322706 A1* | 11/2018 | Drouin | G06T 19/006 |
| 2018/0348023 A1 | 12/2018 | Klein et al. | |
| 2018/0356241 A1* | 12/2018 | Correnti | G01C 21/3647 |
| 2020/0029172 A1* | 1/2020 | Kim | G08B 13/19684 |
| 2020/0067787 A1* | 2/2020 | Patra | H04L 67/12 |

* cited by examiner

MAPPING SENSOR DATA USING A MIXED-REALITY CLOUD

BACKGROUND

Computers and computing systems have impacted nearly every aspect of modern living. For instance, computers are generally involved in work, recreation, healthcare, transportation, and entertainment. Even household and business operations are now being managed via computers, such as through the use of Internet-of-Things (IOT) devices.

In fact, IOT devices are becoming more and more common, with estimates reaching into the billions of devices worldwide. As used herein, the phrase "IOT device" should be interpreted broadly to include any type of standard or nonstandard computing device that is either connected wirelessly or via a wire to a network. Such devices have the ability to both transmit and receive data. IOT devices are often used to connect vehicles, homes, appliances, or any other type of electronic device to the Internet or even to another computing device. Therefore, as used herein, any type of standalone computing device can be considered an IOT device.

In some cases, an IOT device may have a complex computing architecture/configuration and may perform multiple complex processes in parallel or in series with one another. In other cases, an IOT device may have a simplified computing architecture/configuration and may perform only a few simplified tasks or perhaps only one task repeatedly. One example of an IOT device is a smart home thermostat used to automatically monitor and control the climate conditions in the home. Another example of an IOT device is a smart refrigerator that monitors the food conditions or levels within the refrigerator. Yet another example of an IOT device is a smart television. Accordingly, IOT devices are able to perform vastly diverse operations.

In some cases, an IOT device can operate in conjunction with a mixed-reality (MR) system, which includes virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the phrases "virtual image," "virtual content," and "hologram" refer to any type of digital image rendered by an MR system. Furthermore, it should be noted that a head-mounted device (HMD) typically provides the display used by the user to view and/or interact with holograms provided within an MR scene. As used herein, "HMD" and "MR system" can be used interchangeably with one another. HMDs and MR systems are also examples of "computer systems."

With the widespread prevalence of IOT devices (and MR systems), it is becoming more necessary and more difficult to track and monitor where these IOT devices are located within an environment. For instance, many IOT devices are readily portable and can be moved from one location to another with relative ease. Because of their portability, it can be difficult to track and monitor where IOT devices are located and what conditions, states, or statuses they are monitoring (e.g., the temperature conditions of a room can be monitored, but of which specific room?). Accordingly, there exists a substantial need to improve how IOT devices are "re-localized" as well as a substantial need to improve how the IOT device's sensor data and operational coverage area are managed. As used herein, the term "re-localize" (and its variants) refers to the processes performed to determine a specific location of a computing device, including an IOT device, within an environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, methods, and devices (e.g., HMDs and computer-readable hardware storage devices) that improve how IOT devices are re-localized and improve how the IOT device's sensor data and operational coverage area are managed.

In some embodiments, sensor data describing (i.e. representing) one or more condition(s) monitored by an Internet-of-Things (IOT) device is received. In response to receiving this data, a sensor readings map is accessed. This map is associated with the IOT device because it is used to map out the IOT device's environment (i.e. the map is a digital representation of the environment) and includes information representative of the IOT device's location within the environment. The map also records, or rather includes data indicative of or representative of, the conditions monitored by the IOT device. The map is then updated by attaching at least some of the sensor data to the map.

In some embodiments, a head-mounted device (HMD) is specially configured to perform certain operations to visualize sensor data provided from an IOT device. The HMD is configured to display virtual images on a wearable display and is further configured to update the virtual images in response to any number or type of unanticipated external stimuli. Notably, these operations are performed while the HMD is either (i) physically operating within the same environment as the IOT device (e.g., as in the case of an AR system) or (ii) displaying a visualization of the environment in which the IOT device is located (e.g., as in the case of a VR system). Initially, the HMD receives sensor data that was generated by the IOT device. This data describes, or rather is representative of, certain conditions monitored by the IOT device while it was (or is) operating in the environment. The HMD also accesses a digital representation of the environment. The HMD associates the sensor data with the digital representation of the environment. Here, the sensor data corresponds to a specific area in the environment. Furthermore, the process of associating the sensor data with the digital representation includes associating or linking the sensor data with a portion of the digital representation corresponding to the specific area. In response to (i) determining that the HMD is physically proximate to the specific area or (ii) determining that a scene rendered by the HMD is visualizing the specific area, the HMD renders a virtual image on its wearable display. This virtual image is representative of the sensor data. As a consequence, the HMD displays a visualization corresponding to the conditions monitored by the IOT device.

In some embodiments, a server computer system, or rather an MR service operating on the server computer system, re-localizes an IOT device and also updates a map of the IOT device's operational coverage area in response to the IOT device changing locations. To do so, the server computer system receives (e.g., from the IOT device) sensor data describing, or rather representing, a first location of the IOT device within an environment. In response to receiving the sensor data, the server determines that the IOT device has not changed position and then actively refrains from updating a coverage map recording an operational coverage area of the IOT device (or actively prevents the map from being updated). Subsequently, the server receives (e.g., from the IOT device) new sensor data describing or digitally representing a second location of the IOT device. The server compares the new sensor data against the coverage map to determine that the TOT device has changed locations. The server then updates the coverage map to reflect that the TOT device is now located at the second location. Additionally, the server determines a new operational coverage area of the IOT device with respect to the second location. The server also updates the coverage map to reflect this new operational coverage area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
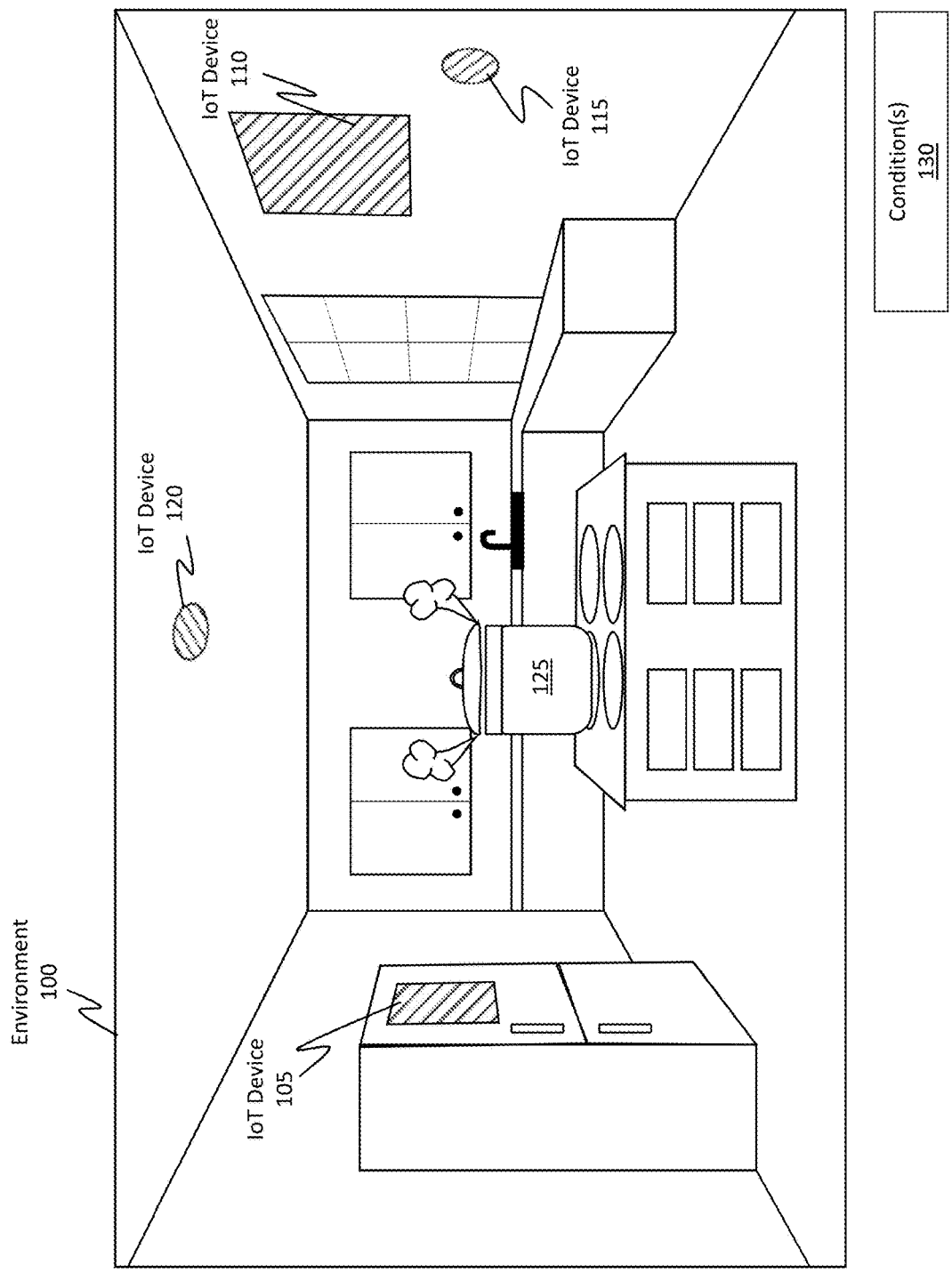
FIG. 1 illustrates an example environment in which multiple IOT devices are operating and collecting sensor data.

The disclosed embodiments relate to systems, methods, and devices (e.g., HMDs and computer-readable hardware storage devices) that improve how IOT devices are re-localized and improve how the IOT device's sensor data and operational coverage area are managed.

In some embodiments, sensor data describing/representing (i.e. the data is structured to represent) one or more condition(s) monitored by an Internet-of-Things (IOT) device is received. A sensor readings map is accessed, where the map maps out, or rather includes data digitally representing, the IOT device's environment and includes information representative of the IOT device's location within the environment. The map also records, or rather includes data indicative of or representative of, the conditions monitored by the IOT device. The map is updated by attaching the sensor data to the map.

In some embodiments, a head-mounted device (HMD) receives sensor data that was generated by an IOT device. This data describes/represents certain conditions monitored by the IOT device while it is operating in an environment. The HMD accesses a digital representation of the environment and associates the sensor data with the digital representation. The sensor data is for a specific area in the environment. The process of associating the sensor data with the digital representation includes associating or linking the sensor data with a portion of the digital representation corresponding to the specific area. The HMD then renders a virtual image on its wearable display to visualize the sensor data. The HMD is configured to display complex virtual images on a wearable display and is further configured to update the virtual images in response to any number or type of unanticipated external stimuli, as will be described later in connection with FIG. 20.

In some embodiments, a server computer system, or rather a mixed-reality "MR" service operating on the server, re-localizes an IOT device and also updates a map of the IOT device's operational coverage area in response to the IOT device changing locations. To do so, the server computer system receives sensor data describing (i.e. the data is structured so as to represent) a first location of the IOT device within an environment. The server determines that the IOT device has not changed position and actively refrains from updating a coverage map recording an operational coverage area of the IOT device. Subsequently, the server receives new sensor data that either (i) describes or digitally represents a second location of the IOT device or (ii) at least indicates (i.e. provides notification data) that the IOT device may have moved. The server compares the new sensor data against the coverage map to determine that the IOT device has changed locations. The server updates the coverage map to reflect the new second location and determines a new operational coverage area of the IOT device with respect to the second location. The server updates the coverage map to reflect this new operational coverage area.

Example Technical Benefits, Advantages, and Improvements

The following section outlines some example improvements and practical applications provided by the disclosed embodiments. It will be appreciated, however, that these are just examples only and that the embodiments are not limited to only these improvements.

The disclosed embodiments operate to improve how a computing architecture operates and/or functions. For instance, the disclosed embodiments are able to obtain more accurate location data by following the disclosed principles. Furthermore, the accuracy can be improved by periodically or continuously updating an IOT device's location data. Providing more accurate location data will provide an MR cloud service (or simply "MR service") with an improved ability to determine the operational coverage area of the IOT device. As an additional example, by initially generating more accurate data, the disclosed embodiments will also improve the operational efficiency of the computing architecture itself because the architecture will perform far less (or perhaps none at all) post-processing corrections and compensations. That is, by generating accurate data earlier on in the processing pipeline, the architecture can perform less corrections later on in the processing pipeline. It is typically the case that making corrections earlier on in a process is far more efficient than making corrections later on in the process. As a consequence, the disclosed embodiments operate to improve the computing efficiency and resource utilization of a computer system and computing architecture.

Determining the operational coverage area of the IOT device will also enable the MR service to estimate or gauge the performance of the IOT device at that location. If the IOT device's performance might be impaired at that location for some reason, then the MR service can raise an alert or provide feedback with a recommendation on how and where the IOT device should be moved (e.g., if an IOT fire alarm is immediately next to an out-blowing air vent, then the fire alarm may not be able to accurately detect smoke when a fire occurs because the out-blowing air might impede the fire alarm's detection sensors). The generated recommendation, therefore, can operate to substantially improve the performance of the IOT device.

In some cases, the MR service can also give recommendations on where to set up any number of WiFi routers within an environment so as to provide an optimal amount of wireless coverage. By "optimal," it is generally meant that a majority of the environment (or at least some desired amount of the environment) is connectable via one or more of the routers and that the signal strength with those routers satisfies a desired connection strength. In this regard, the embodiments also provide mapping or placement benefits with regard to designing a wireless network and the network's wireless coverage areas.

IOT Devices in an Environment

Attention will now be directed to FIG. 1, which illustrates an example environment 100 in which multiple IOT devices are located. Environment 100 is shown as including IOT device 105 (e.g., a smart refrigerator), IOT device 110 (e.g., a smart TV), IOT device 115 (e.g., a smart climate control device), and IOT device 120 (e.g., a smart temperature sensor). Environment 100 also includes a pot 125 located on a stove, where liquid in the pot 125 is hot and is producing steam.

IOT devices 105-120 are able to detect, monitor, or observe any number of condition(s) 130. As an example, the IOT devices can detect environmental conditions, such as temperature conditions, humidity levels, barometric pressure levels, smoke levels, carbon monoxide levels, radiation levels, or even air flow levels. IOT device can also detect the presence or absence of certain conditions (e.g., the presence of people, animals, fixtures, or goods). IOT devices can even detect, monitor, and report the operational conditions of another device (or of itself if the IOT device includes additional sensing functionalities), such as the processor load of a sensor, memory usage, operating temperature, and so on. IOT devices can also detect the presence or absence of materials in an environment (e.g., the presence or absence of certain grocery products in the refrigerator). Accordingly, IOT devices can be configured to monitor any factor, parameter, or condition. The above descriptions are provided for example purposes only, and the disclosed principles should be interpreted broadly to include any number of conditions without restriction.

Figure 2:
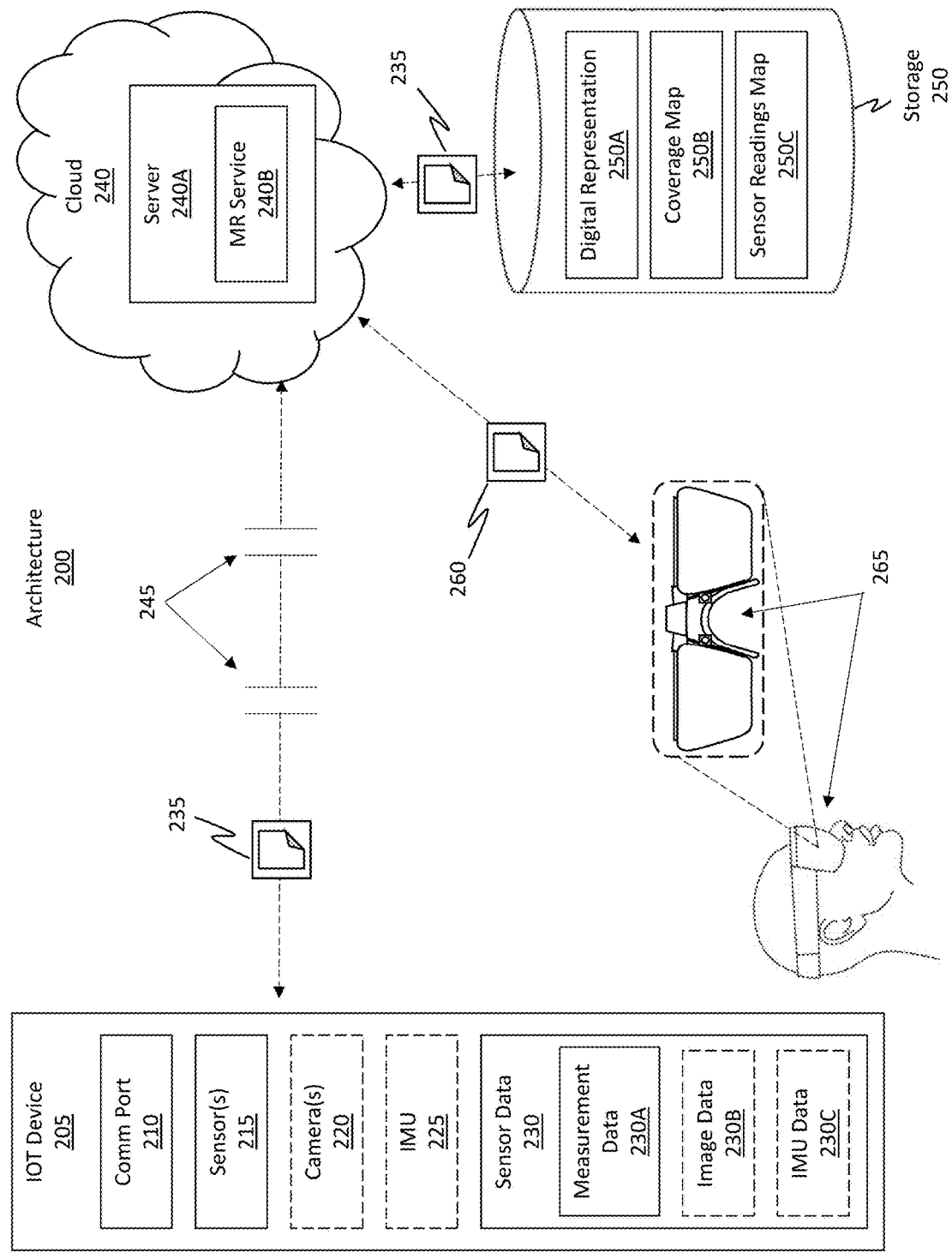
FIG. 2 illustrates an example architecture in which an IOT device is able to communicate with a mixed-reality cloud service, which is configured to collect sensor data from the IOT device and to re-localize the IOT device based on the sensor data.

FIG. 2 shows an example architecture 200 that includes an IOT device 205. IOT device 205 may be representative of any one of the IOT devices from FIG. 1 (e.g., IOT devices 105-120).

IOT device 205 is shown as including a comm port 210 (i.e. a communication port or communication channel), which is used to send and/or receive data over a network. For instance, when information is sent or received over a network to another computer (e.g., one that has an internet protocol (IP) address), information may be sent or received at one (though perhaps more) of the IOT device's communication channels/ports. In some cases, an IP address may be associated with a large number of ports. Furthermore, in some cases, an IP address can be simultaneously associated with multiple different types of ports. To illustrate, an IP address may be associated with both a transmission control protocol (TCP) port and a user datagram protocol (UDP) port, just to name a couple. Accordingly, comm port 210 is used by IOT device 205 to communicate with any number of other computer systems, networks, or devices.

IOT device 205 is also shown as including one or more sensor(s) 215. Sensor(s) 215 are used to detect, monitor, or observe the conditions described earlier (e.g., condition(s) 130 from FIG. 1). It will be appreciated that any number of sensors may be included among sensor(s) 215 (e.g., temperature sensors, radiation sensors, etc.).

Camera(s) 220 in FIG. 2 is illustrated using a dotted box to demonstrate that some, though not necessarily all, IOT devices can include a camera. Here, camera(s) 220 can be used to not only capture condition data (e.g., by scanning a refrigerator to detect the presence or absence of groceries), but they may also be used to capture location data, as will be described in further detail later. As a brief introduction, however, camera(s) 220 can be used to capture images of the IOT device 205's surrounding environment. These images can then be transmitted to a central server so that the server can perform a re-localization process to determine the location of IOT device 205.

Similar to camera(s) 220, IMU 225 is also surrounded by a dotted line to indicate that some, though not necessarily all, IOT devices can include an inertial measurement unit (IMU). An IMU can include any number of gyroscopes, accelerometers, and/or magnetometers. An IMU operates by detecting changes in acceleration or movement. Movements cause the IMU to generate movement data describing (i.e. that is representative of) how the IMU has been moved. As will also be described in further detail later, IMU 225 can be used to raise a triggering alert to notify the central server when the IOT device 205 has been moved. Although not shown, IOT device 205 can also include a global positioning system (GPS) to determine GPS coordinates of IOT device 205 or even a telecommunications SIM card to communicate with a telecommunications network and to potentially triangulate IOT device 205's position using the telecommunications network.

FIG. 2 also shows how IOT device 205 is able to collect any type or amount of sensor data 230. Sensor data 230 can include measurement data 230A (e.g., data collected from sensor(s) 215 including any type of sensed data such as environmental data describing/representing the environment or even operational data of a device), image data 230B (e.g., image data generated or captured by camera(s) 220), and IMU data 230C (e.g., movement data generated by IMU 225 describing (i.e. digitally representing) any movements of the IOT device within its environment). Any amount or type of collected or sensed data may be included in sensor data 230.

Architecture 200 shows how IOT device 205 is transmitting and/or receiving data 235 across a network to a cloud 240, and in particular to a server 240A operating or executing a mixed-reality (MR) service 240B. Server 240A can be considered a type of "central server," which was introduced earlier.

Lapses 245 demonstrate how IOT device 205 can operate even when it is not continuously connected to the cloud 240. One feature of an IOT device is that it is often considered to be a lower priority device when it comes to bandwidth availability. Often, because of its lower bandwidth priority, communications destined to or transmitted by an IOT device are delayed until the bandwidth levels reach an acceptable level (i.e. are not being overly consumed by other higher priority devices). Additionally, IOT devices are often designed to work well even when faced with relatively high levels of latency in the transmissions of their communications. Accordingly, lapses 245 are illustrated to represent any amount of delay, latency, network blockage, or network throttling and how IOT device 205 is able to operate even when faced with these lapses 245.

Data 235 is provided to represent the transmission of sensor data 230 from IOT device 205 to the MR service 240B and/or any data received from the MR service 240B. That is, IOT device 205 is able to package its sensor data 230 and transmit it via data 235 to the MR service 240B. As will be described later, MR service 240B can then process data 235 to not only re-localize IOT device 205 but also to compile and analyze the measurement data 230A, image data 230B, and IMU data 230C. MR service 240B can also determine the operational coverage area of IOT device 205 within the IOT device's environment, as will be described later.

FIG. 2 shows how MR service 240B is able to store the data 235 in storage 250. Storage 250 includes, but is not limited to, a three-dimensional (3D) digital representation 250A of the environment in which IOT device 205 is located. Storage 250 also includes a coverage map 250B of the IOT device 205, where the coverage map 250B describes, or rather digitally represents, the operational coverage area monitored by IOT device 205. Additionally, storage 250 includes a sensor readings map 250C for IOT device 205, where the sensor readings map 250C is used to track and record the sensor data 230 of IOT device 205 relative to its environment. Further details on these aspects will be provided later.

In some cases, MR service 240B is able to transmit some or all of the received data 235 to another device, as shown by data 260. In FIG. 2, MR service 240B is transmitting data 260 to an HMD 265. HMD 265 will then be able to visually display some or all of IOT device 205's sensor data 230. Accordingly, MR service 240B may also be configured to transmit at least some of sensor data to a mixed-reality (MR) device that is either (i) physically operating within the same environment as IOT device 205 or (ii) displaying a visualization of the environment.

Example Method(s)

Figure 3A:
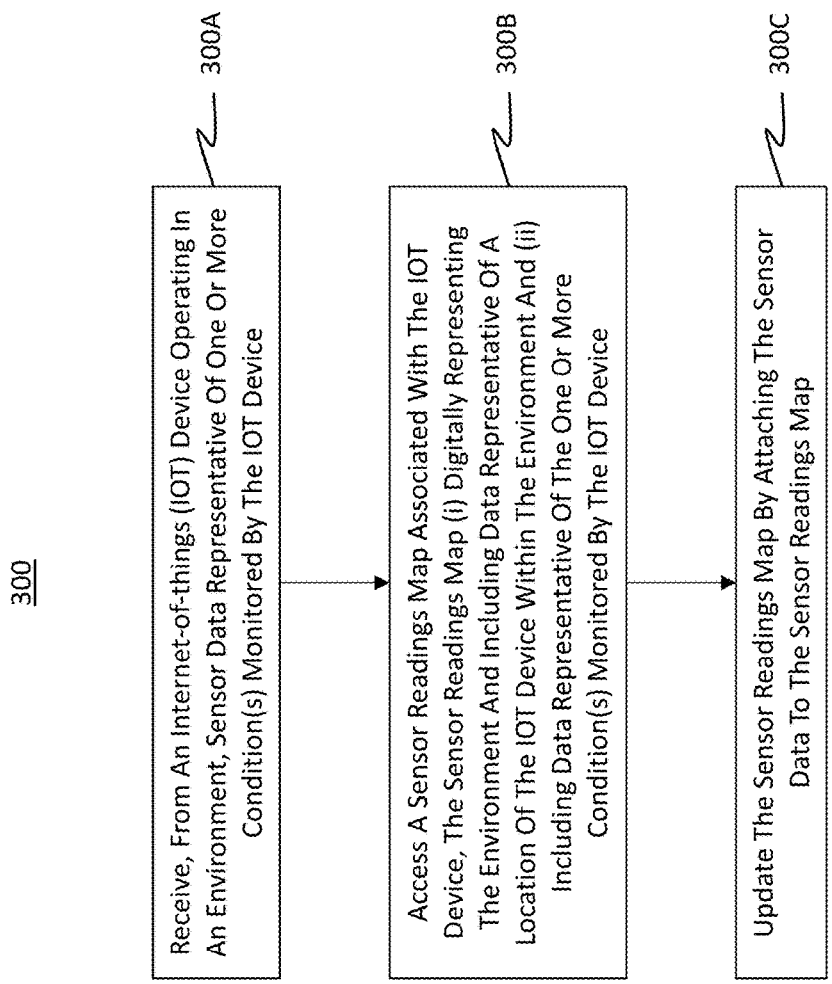
FIG. 3A illustrates a flowchart of an example method for updating a sensor readings map based on sensor data provided from an IOT device.
Figure 3B:
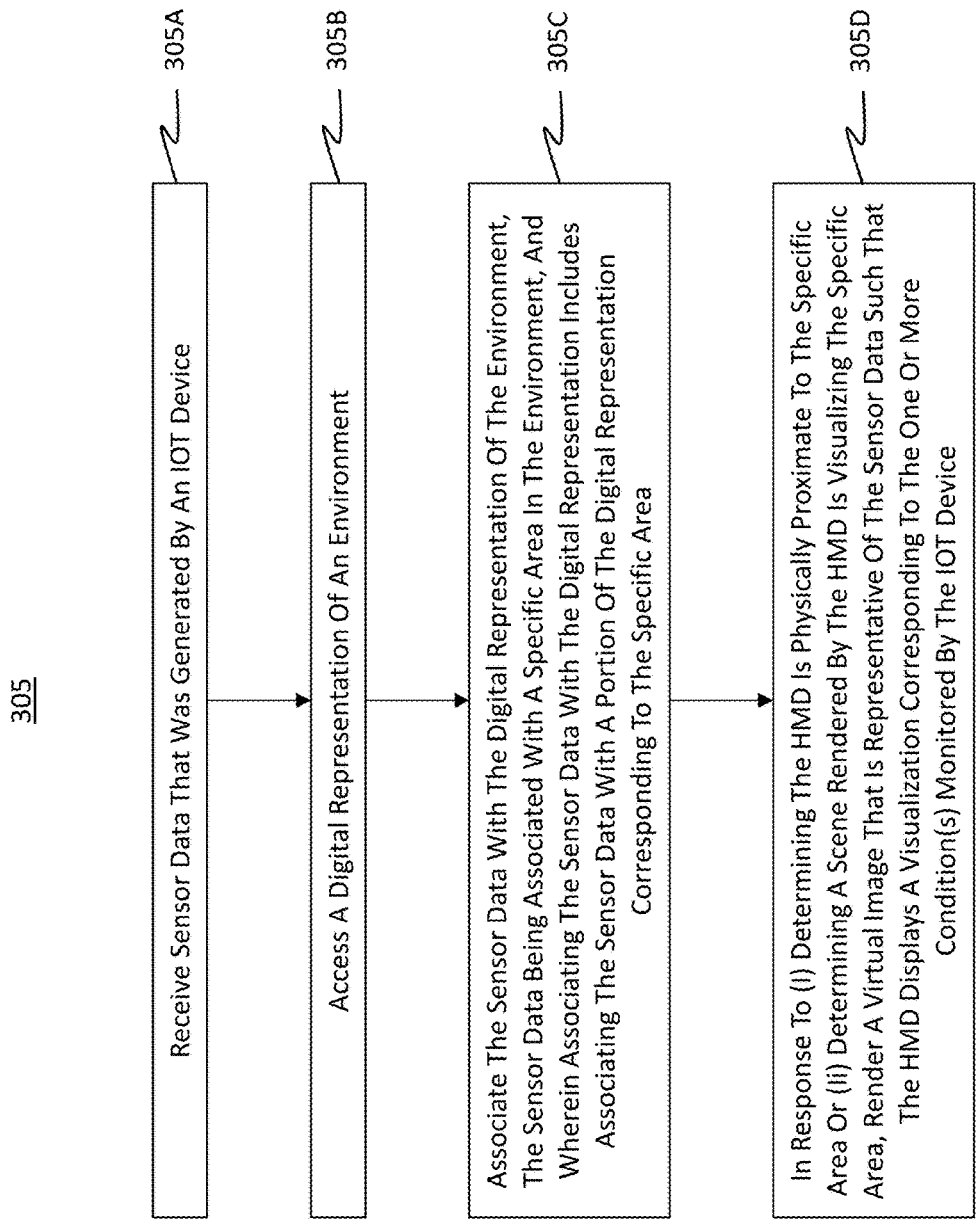
FIG. 3B illustrates a flowchart of an example method for enabling a head-mounted device (HMD) to visualize sensor data collected by an IOT device.

Attention will now be directed to FIGS. 3A and 3B, which illustrate flowcharts of different methods that may be performed by some of the entities described in architecture 200 of FIG. 2. Accordingly, the following discussion will now refer to a number of methods and method acts that may be performed. Although the method acts may be discussed in a certain order or illustrated in a flow chart as occurring in a particular order, no particular ordering is required unless specifically stated, or required, because an act is dependent on another act being completed prior to the act being performed.

FIG. 3A illustrates a flowchart of an example method 300 for collecting sensor data from an IOT device and for using the sensor data to update a sensor readings map associated with the IOT device. Method 300A may be performed by the server 240A from FIG. 2, and in particular may be performed by the MR service 240B operating on server 240A.

Initially, method 300 includes an act 300A of receiving, from an internet-of-things (IOT) device (e.g., IOT device 205 from FIG. 2) operating in an environment, sensor data (e.g., sensor data 230 included within data 235 of FIG. 2) describing (i.e. digitally representing) one or more condition(s) monitored by the IOT device (i.e. the data is structured to digitally represent the conditions). As described earlier, the sensor data can include measurement data from the IOT device's sensors, image data from the IOT device's camera(s), and IMU data from the IOT device's IMU.

In response to receiving the sensor data, method 300 includes an act 300B of accessing a sensor readings map (e.g., sensor readings map 250C from FIG. 2) associated with the IOT device. Here, the sensor readings map maps out, or rather digitally represents, the environment and includes information representative of a location of the IOT device within the environment. Additionally, the sensor readings map records, or rather includes data indicative of or representative of, the condition(s) monitored by the IOT device.

Method 300 then includes an act 300C of updating the sensor readings map by attaching, linking, or otherwise associating the sensor data to the sensor readings map. In this manner, the sensor readings map is able to track and monitor the sensor data captured by the IOT device. As a result of updating the sensor readings map to include the sensor data, the sensor readings map is also updated to include measurement data generated by the IOT device. Additionally, as a result of these operations, the server computer system also includes updated information regarding sensed operational conditions of the IOT device (e.g., a current temperature sensed by the IOT device, a current level of radiation, a current status or state, etc.).

Figure 4:
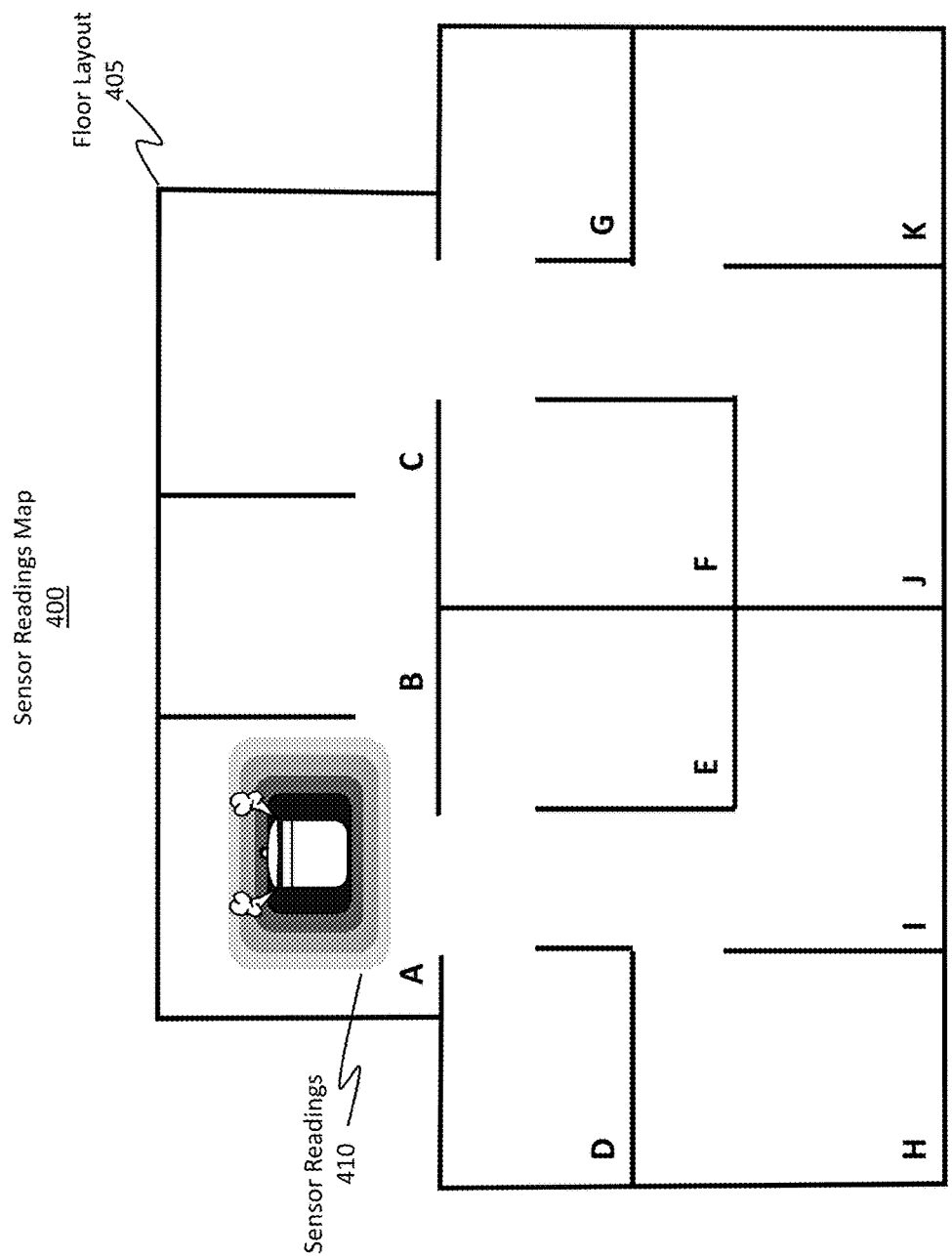
FIG. 4 provides an example illustration of a sensor readings map for an IOT device relative to the layout of a particular environment.

Turning briefly to FIG. 4, there is shown an example of a sensor readings map 400, as described in connection with method 300. Sensor readings map 400 depicts a visualization of the environment (i.e. the map digitally represents the environment) in which the IOT device is currently located. In particular, the IOT device is located within a home (or building) that has a floor layout 405, and sensor readings map 400 can provide a visual depiction of the floor layout 405 (i.e. display of the map results in a visualization of the floor layout being presented to a user).

In this scenario, floor layout 405 includes multiple rooms, such as rooms A, B, C, D, E, F, G, H, I, J, and K. Here, the IOT device is a temperature sensor and is currently located in room A of the floor layout 405. Consequently, the IOT device is measuring, detecting, or otherwise observing the temperature conditions, states, or parameters of room A. Room A is also shown as including the steaming pot described earlier, but the visualization of the floor layout 405 is not required to illustrate the pot.

Sensor readings map 400 is currently providing a visual depiction of the temperature gradient currently present in room A, as shown by sensor readings 410 (i.e. display of the map results in a visualization of the temperature gradient being presented). For instance, room A is representative of environment 100 from FIG. 1. Here, room A includes the pot 125 that was spewing hot steam. The hot steam is causing a temperature gradient to be present in room A. The temperature gradient is visually illustrated within the sensor readings map 400. Hotter temperatures are provided at locations more proximate to pot 125. As the distance increases away from pot 125, the temperature decreases. The IOT device is able to monitor and detect the temperature in room A. By acquiring the sensor data from the IOT device, the MR service (e.g., MR service 240B from FIG. 2) is able to plot, graph, or otherwise visually record this sensor data in the form of the sensor readings map 400. In addition to a visual rendition of the IOT device's sensor data, the sensor readings map 400 may also include numerical and/or textual records detailing the sensor data. Accordingly, method 300 of FIG. 3A may be performed to generate and/or update a sensor readings map for an IOT device.

In some embodiments, a visual timestamp or other indication can be provided to a user to indicate the freshness or staleness of the last scan of the room. For instance, suppose a first user maps out a given room. Here, a timestamp can be attached or otherwise linked to the scanning data of that room to indicate when the scan either commenced or when the scan was completed. Later, when a second user enters the room, the timestamp of the first scan can be visually displayed to the second user. By displaying the timestamp, the second user can be informed as to when the room was previously scanned and whether the scanning data is stale or is fresh. Staleness/freshness can be dependent on any number of factors. For instance, scanning data for environments that have many objects capable of moving may remain fresh for only a relatively short period of time (e.g., perhaps a few minutes or even hours). In contrast, scanning data for environments that have few or no objects capable of moving may remain fresh for a relatively longer period of time (e.g., perhaps hours, days, weeks, or even months). As such, freshness and/or staleness may be dependent on the attributes or characteristics of the environment, including objects located within the environment.

Turning now to FIG. 3B, this figure illustrates a flowchart of an example method 305 that may be performed by an HMD, such as HMD 265 from FIG. 2. This HMD includes a wearable display and can perform the method acts of method 305 while either (i) physically operating within the same environment as the IOT device (e.g., such as an AR system) or (ii) displaying a visualization of the environment in which the IOT device is located (e.g., such as a VR system). By way of further clarification, the HMD can be physically present in environment 100 of FIG. 1 or, alternatively, the HMD can be rendering any number of virtual images representative of environment 100.

Initially, method 305 includes an act 305A of receiving sensor data that was generated by the IOT device. Here, the sensor data may be included in data 260 from FIG. 2. Furthermore, this sensor data describes or digitally represents one or more condition(s) (e.g., conditions 130 from FIG. 1) monitored by the IOT device while the IOT device operates in the environment (e.g., environment 100 of FIG. 1).

Method 305 then includes an act 305B in which the HMD accesses a digital representation of the environment. As an example, the digital representation may be the digital representation 250A managed by the MR service 240B in FIG. 2 or, alternatively, the digital representation may be a 3D digital representation generated by the HMD itself. That is, the HMD may include any number of scanning sensors (e.g., depth cameras or other depth sensors) that are used to map out the three-dimensional geometries, shapes, and/or contours of the environment. The resulting mapping data can be used to generate the 3D digital representation of the environment. In some cases, the 3D digital representation can include a 3D surface reconstruction mesh, a 3D point cloud, and/or any number or other types of depth maps representative of the environment. In this regard, the HMD is able to access a digital representation of the environment.

Next, method 305 includes an act 305C of associating the sensor data with the digital representation of the environment. Notably, the sensor data is associated with a specific area in the environment. With reference to FIG. 4, the sensor data (e.g., the sensor readings 410) is associated with room A (i.e. a specific area) within the floor layout 405 of the environment that includes rooms A through K.

Associating the sensor data with the digital representation includes associating, linking, relating, or otherwise attaching the sensor data with a portion of the digital representation corresponding to the specific area. For instance, the digital representation may include three-dimensional data and/or two-dimensional data describing (i.e. corresponding or being representative of) at least room A of the floor layout 405 from FIG. 4. In some cases, the digital representation may also describe the other rooms (i.e. rooms B through K) included in the floor layout 405. Therefore, because the digital representation at least describes room A, the sensor data can be linked or associated with the digital representation's data corresponding specifically to room A.

Returning to FIG. 3B, in response to (i) determining the HMD is physically proximate to the specific area or (ii) determining a scene rendered by the HMD is visualizing the specific area, method 305 includes an act 305D of rendering a virtual image on the HMD's wearable display. This virtual image is representative of the sensor data. As a consequence, the HMD displays a visualization corresponding to the one or more condition(s) monitored by the IOT device. An example of the processes performed in method 305 is provided in FIG. 5.

Figure 5:
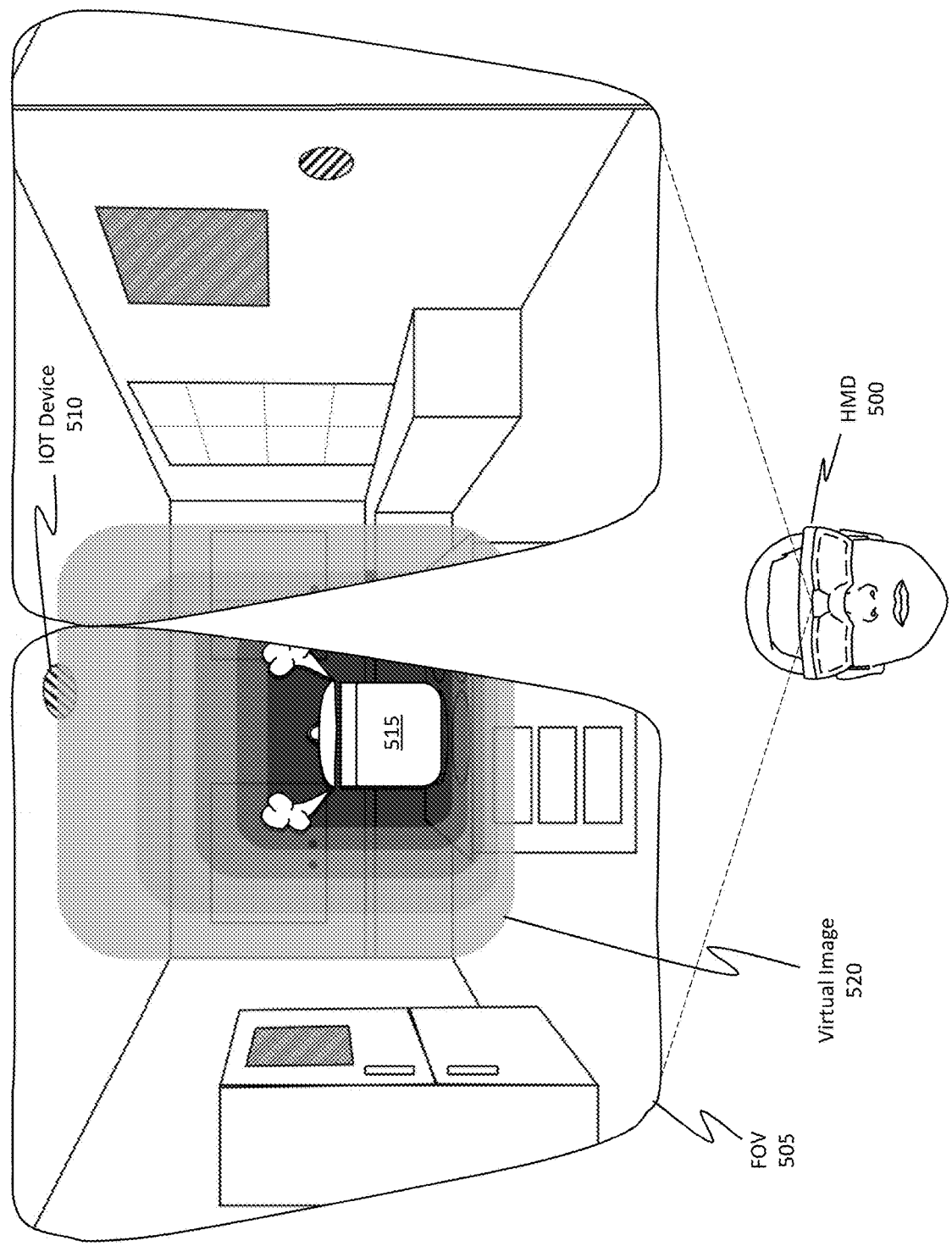
FIG. 5 illustrates a holographic visualization of an IOT device's sensor data, as visualized by an HMD.

Specifically, FIG. 5 shows an HMD 500, which is representative of HMD 265 from FIG. 2. HMD 500 is shown as including a "field of view" FOV 505. FOV 505 is the observable area within the HMD's wearable display the user can view while wearing HMD 500. Here, HMD 500 is either an AR system, in which case HMD 500 is physically present in environment 100 of FIG. 1 or, alternatively, HMD 500 is a VR system, in which case HMD 500 is simply rendering a visualization of environment 100. In any event, FIG. 5 shows how IOT device 510 (which is representative of (i) the IOT devices from methods 300 and 305; (ii) the IOT device 205 from FIG. 2; and (iii) the IOT device 120 from FIG. 1) is currently viewable within FOV 505. IOT device 510 is a temperature sensor capable of detecting or monitoring temperature conditions in the environment. The pot 515, which corresponds to pot 125 from FIG. 1, is also visible within FOV 505. Here, pot 515 is shown as releasing hot steam into the room.

As described in method 305 of FIG. 3B, HMD 500 has received sensor data that was generated by IOT device 510. In some cases, the sensor data is received from an MR service (e.g., MR service 240B from FIG. 2) while in other cases the sensor data is received directly from the IOT device without having passed through the MR service. Use of the phrase "directly" does not necessarily mean a 1-to-1 communication. Rather, "directly" simply means that the communication did not have to pass through the cloud 240. Indeed, the communication may rely on any number of other intermediary devices, such as routers, switches, and so forth. Accordingly, the sensor data can be received either (i) from a mixed-reality (MR) service operating in a cloud environment (e.g., where the MR service received the sensor data prior to transmitting the sensor data to the HMD) or (ii) from the IOT, which bypassed the MR service.

In response to receiving the sensor data from the external IOT device (i.e. external to the HMD 500), HMD 500 then renders a virtual image 520 corresponding to IOT device 510's sensor readings. For instance, FIG. 5 shows how HMD 500 is rendering a temperature gradient around pot 515. Areas relatively closer to pot 515 are visualized as being hotter (e.g., the darker areas in virtual image 520) while areas relatively farther away from pot 515 are visualized as being cooler (e.g., the progressively lighter areas around pot 515). As such, HMD 500 is able to visualize the sensor data generated by IOT device 510 and can be used to visualize the conditions, parameters, or factors monitored by IOT device 510.

In some implementations, the IOT device transmits its sensor data at a predetermined frequency. Examples of the frequency can be every few seconds, minutes, hours, days, weeks, or perhaps even months. In some implementations, the IOT device transmits its sensor data in response to one or more triggering conditions. These triggering conditions can include detecting that a change in one of its monitored conditions has occurred. For instance, the IOT device may be configured to continuously or periodically acquire sensor data. This sensor data can be stored on the IOT device in a buffer, cache, or memory. If the values of the sensor data do not change from one iteration to another (i.e. from one capture of sensor data to another), then there may not be a need to transmit redundant or repetitive data to the MR service (or HMD). Therefore, in some embodiments, the IOT device transmits data only in response to a detected change in the conditions it is monitoring. Of course, these conditions can be any monitored condition.

As an example, the IOT device can transmit its sensor data in response to changes in temperature, humidity, operational circumstances, or even a change to the IOT device's own location (e.g., as detected by changes in IMU data and/or changes as recorded by the images captured by the IOT device's cameras). Accordingly, in at least one example, the sensor data can be received by an MR service and/or by an HMD in response to a change in location by the IOT device. Further details on this aspect will be provided later.

In addition to displaying three-dimensional virtual images (e.g., virtual image 52), HMD 500 is also able to display a two-dimensional (2D) version of the sensor readings map 400 from FIG. 4. HMD 500 can display the sensor readings map 400 simultaneously with the virtual image 520 within FOV 505. As an example, the sensor readings map 400 can be displayed as a mini-map within FOV 505.

Optionally, HMD 500 can be configured to switch between displaying the sensor readings map 400 (e.g., where it occupies all or a majority of the FOV 505) and the virtual image 520, such that only one is displayed at any single time. Switching between the two visualizations can be performed in response to a command, such as a voice activated command, a virtual button press command (e.g., where the button is a virtual image displayed in the FOV 505), or a physical button press command (e.g., on the HMD 500 itself, on a handheld device, or another computer system).

Operational Coverage Areas of an IOT Device

Figure 6:
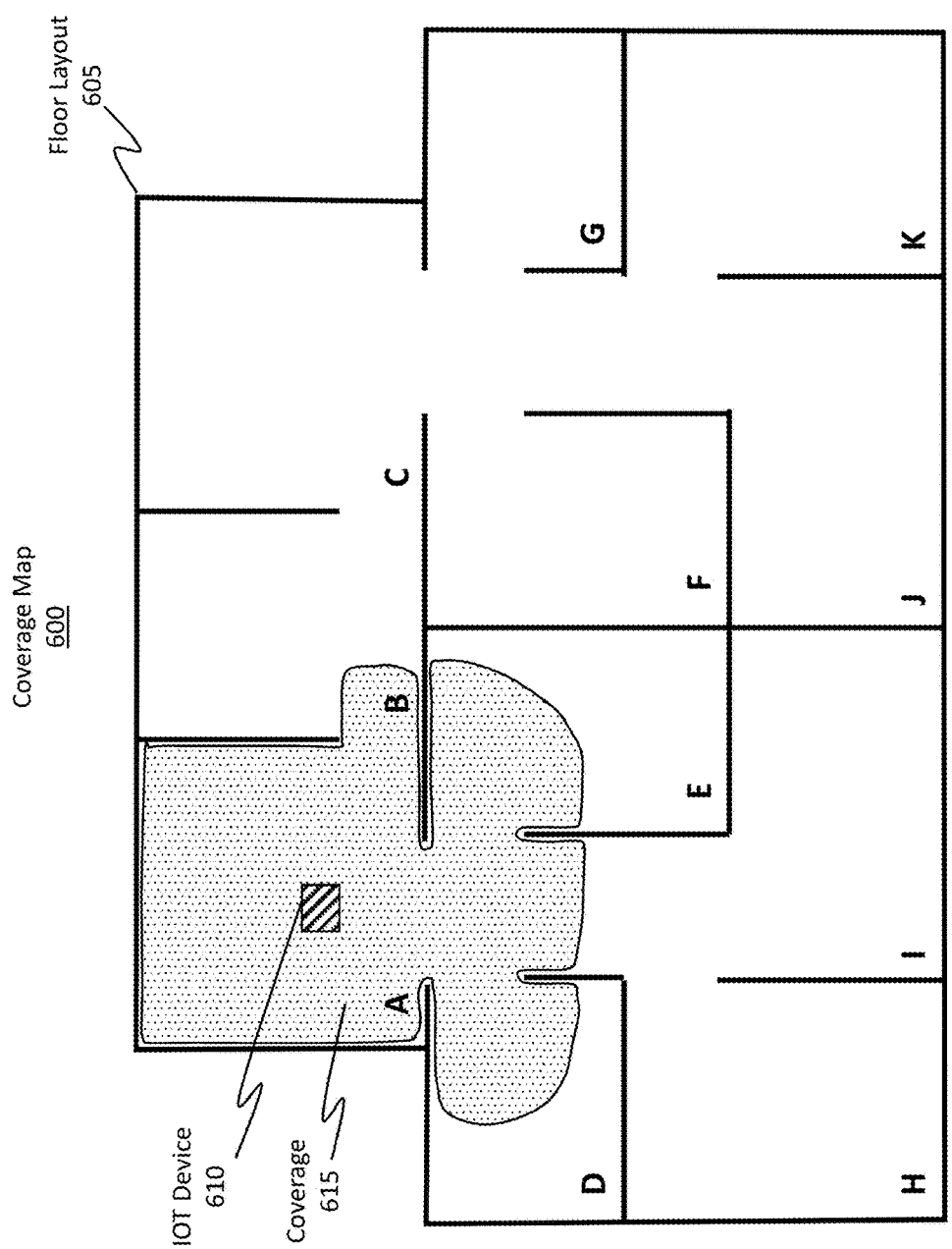
FIG. 6 provides an example illustration of an estimated, deduced, or derived operational coverage area for an IOT device relative to the layout of a particular environment.

FIG. 6 shows an example of a determined coverage map 600 of an IOT device, such as IOT device 205 from FIG. 2. Here, coverage map 600 is representative of the coverage map 250B maintained by MR service 240B in FIG. 2.

Coverage map 600 outlines a floor layout 605 of an environment in which an IOT device is located. Floor layout 605 includes rooms A, B, C, D, E, F, G, H, I, J, and K. An IOT device 610 is located in room A. IOT device 610 is representative of IOT device 205 from FIG. 2 and IOT device 120 from FIG. 1, and room A is representative of room A from FIG. 4 as well as environment 100 from FIG. 1. IOT device 610 is a temperature sensor used to detect temperature within its environment, as described in the examples used previously. It should be noted that while coverage map 600 from FIG. 6 and sensor readings map 400 from FIG. 4 were illustrated as two-dimensional (2D) maps, these maps may also include 3D data describing (or digitally representing) the environment or floor layout in a three-dimensional manner.

In accordance with the operational characteristics of IOT device 610, this temperature sensor (i.e. IOT device 610) is configured to detect the temperature within a range surrounding the sensor. Areas closer to the temperature sensor may be sensed more accurately than areas further away from the temperature sensor. Eventually, areas so far removed from the temperature sensor will not be able to be monitored. As such, the "operational coverage area" of the temperature sensor includes a limited range spanning a certain distance or radius from the temperature sensor.

Because IOT device 610 (in the example shown in the provided figures) is operating in a closed environment surrounded by multiple impeding obstructions, such as walls, doors, floors, and ceilings, the operational coverage area of the IOT device 610 may also be impeded in certain directions. As an example, a fire alarm placed in one room will likely be able to detect smoke within that room, but it may not be able to detect smoke in an adjacent room because a wall is between the two rooms. Similarly, a temperature sensor may be adequate to detect the temperature conditions of its own room, but it may not be adequate to detect the temperature of another room. Accordingly, there may be impedances that block or restrict the operational coverage area of the IOT from sensing to its full potential or range.

It may be the case, however, that some IOT sensors are not blocked by structural impedances, such as walls. For instance, an IOT device in the form of a Geiger counter may be able to detect radiation to its full range even when enclosed in a room having drywall walls. As such, it will be appreciated that the range of IOT devices may or may not be impeded by structural confines.

If the sensing range for an IOT device is likely to be impeded by structural or other boundaries, then the MR service 240B from FIG. 2 is able to estimate, deduce, determine, predict, or otherwise generate an estimated operational coverage 615 for the IOT device 610, where the coverage 615 is determined based on the characteristics of the IOT device's environment, including any boundaries surrounding the IOT device 610. To clarify, coverage 615 is dynamically computed by the MR service 240B to attempt to identify the actual operational coverage area of the IOT device 610 when it operates within the confines of a particular environment (e.g., IOT device 610 is operating in room A of the environment that includes rooms A through K).

To determine coverage 615, the MR service is able to acquire the operational characteristics (e.g., range, sensing strength, etc.) of the IOT device 610. These operational characteristics can be acquired from the Internet or from another publicly available source. Optionally, the operational characteristics can be manually provided to the MR service. The MR service is also able to analyze the characteristics of the environment in which the IOT device is physically located. For instance, the MR service can analyze the attributes of room A, which is representative of environment 100 from FIG. 1. The MR service can also analyze the orientation of the IOT device relative to its position in the room.

For example, in FIG. 1, IOT device 120 (which is representative of IOT device 610) is positioned on the ceiling and is pointed or aimed downward. The MR service can determine that the operational coverage area is directed in a downward direction and likely will not cover any areas above the IOT device 120. Additionally, the MR service can derive that the operational coverage area of the IOT device 120 may be blocked by the walls near the refrigerator, sink, and smart TV. FIG. 6, therefore, shows how a substantial majority of room A is included within coverage 615. Coverage 615 may also partially extend into room B, which shares a pathway or doorway with room A. Additionally, coverage 615 may partially extend into rooms D and E and the corridor between rooms D and E. In this example scenario, the walls of the rooms operate to partially block or impede the sensing abilities of IOT device 610.

Accordingly, based on the operational characteristics of the IOT device 610 as well as the identified characteristics of the environment in which IOT device 610 is operating, the MR service is able to derive, deduce, or generate an estimated operational coverage area (i.e. coverage 615) of IOT device 610. The MR service may use or rely on any type of machine learning to generate coverage 615. The machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system). Any amount of training data may be used (and perhaps later refined) to train the machine learning algorithm to dynamically compute the estimated coverage 615.

Optionally, a safety buffer can be used to further limit the computed coverage 615 so as to generate a very conservative measurement for coverage 615. For instance, an initial operational coverage area may be derived by the MR service. Once this initial coverage area is generated, then a safety buffer may be imputed onto the coverage area so as to improve the likelihood that the resulting estimated coverage area does at least cover (though perhaps not fully) the real-world coverage area of the IOT device. The safety buffer may further limit or restrict the initially-generated operational coverage area by a certain fraction or percentage. For instance, the safety buffer may limit the initially-generated operational coverage area by 99%, 98%, 97%, 96%, 95%, 90%, 85%, 80%, 75%, 70%, and so on.

As illustrated in FIG. 6, the resulting estimated coverage 615 may be designed by the MR service to generally follow the confines or boundaries of the environment. For instance, coverage 615 generally takes on the shape of room A. Coverage 615 is also somewhat extended into the other rooms (e.g., rooms B, D, and E), but the extension is limited or restricted in accordance with the shape of the doorways or pathways between those rooms. Accordingly, in some embodiments, the MR service is able to maintain a coverage map detailing (i.e. digitally representing) an estimated operational coverage area of the IOT device relative to its current environment.

Figure 7:
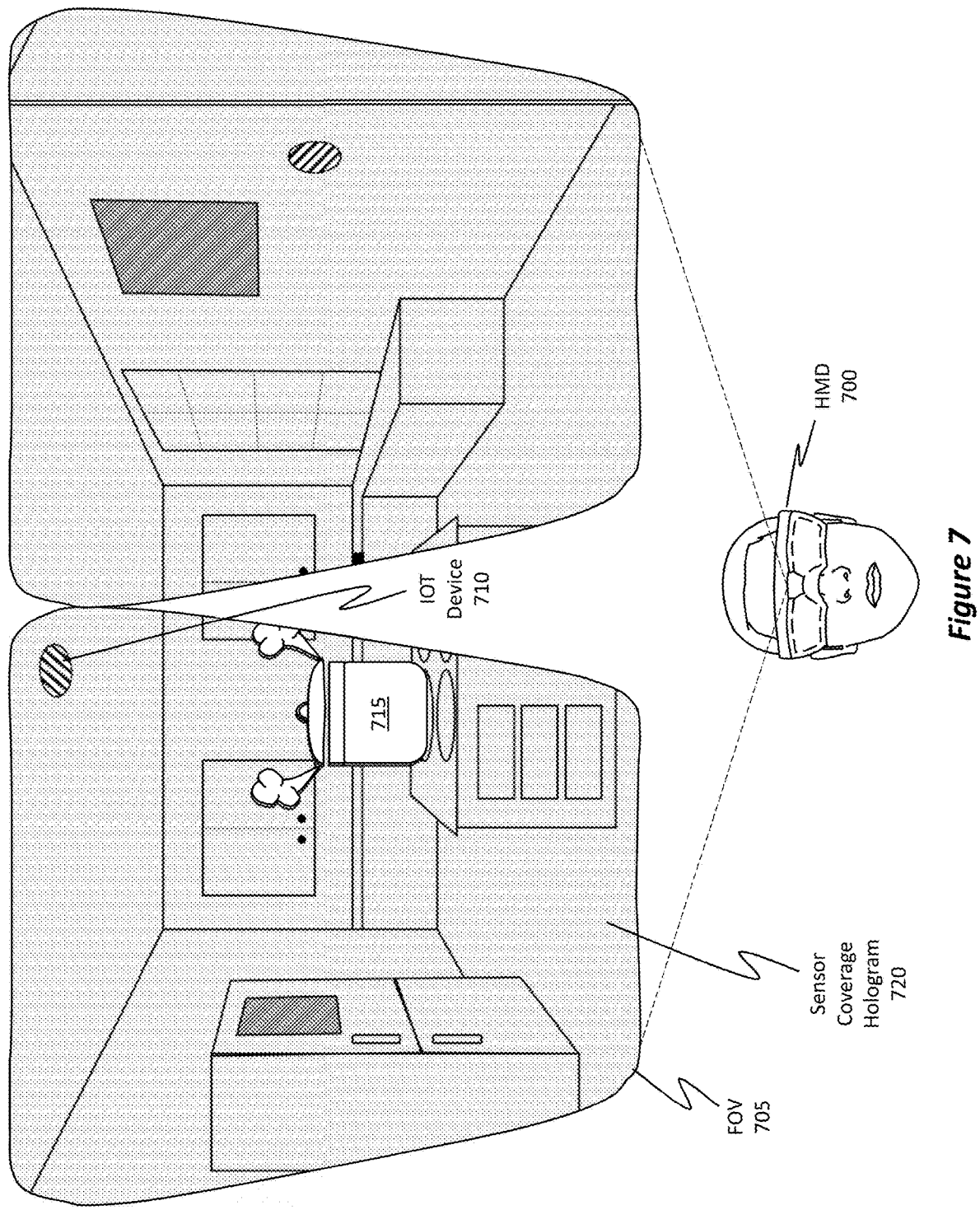
FIG. 7 illustrates a holographic visualization of an IOT device's operational coverage area, as visualized by an HMD.

FIG. 7 illustrates an example scenario in which an HMD 700 is able to render within its FOV 705 a visualization corresponding to the IOT device's estimated operational coverage area. For example, in FIG. 7, HMD 700 is either physically present in the same environment as IOT device 710, which is representative of IOT device 610 from FIG. 6, or it is visualizing the environment. Similar to the other figures and environments, FIG. 7 shows a pot 715.

Here, however, HMD 700 is not rendering sensor data from IOT device 710; instead, HMD 700 is rendering a visualization, or rather a virtual image, corresponding to the estimated coverage 615 from FIG. 6, as shown by sensor coverage hologram 720. Because HMD 700 is in (or at least rendering) only room A of the environment, the entirety of the FOV 705 is shown as being covered by the sensor coverage hologram 720. If the HMD 700 were positioned near the doorways to room A or if HMD 700 were aimed at those doorways, then the entirety of the FOV 705 may not be fully covered by sensor coverage hologram 720. That is, only the estimated coverage area of the IOT device 710 will be covered by the sensor coverage hologram 720.

As an additional example, suppose HMD 700 were located in room D of FIG. 6 (or was visualizing room D). Here, only a portion of room D would be shown as being covered by the sensor coverage hologram 720. Furthermore, if HMD 700 were positioned in room E, then only a portion of room E would be shown as being covered by the sensor coverage hologram 720. To complete the example, if HMD 700 were positioned in room B, then only a portion of room B would be shown as being covered by the sensor coverage hologram 720.

Figure 8:
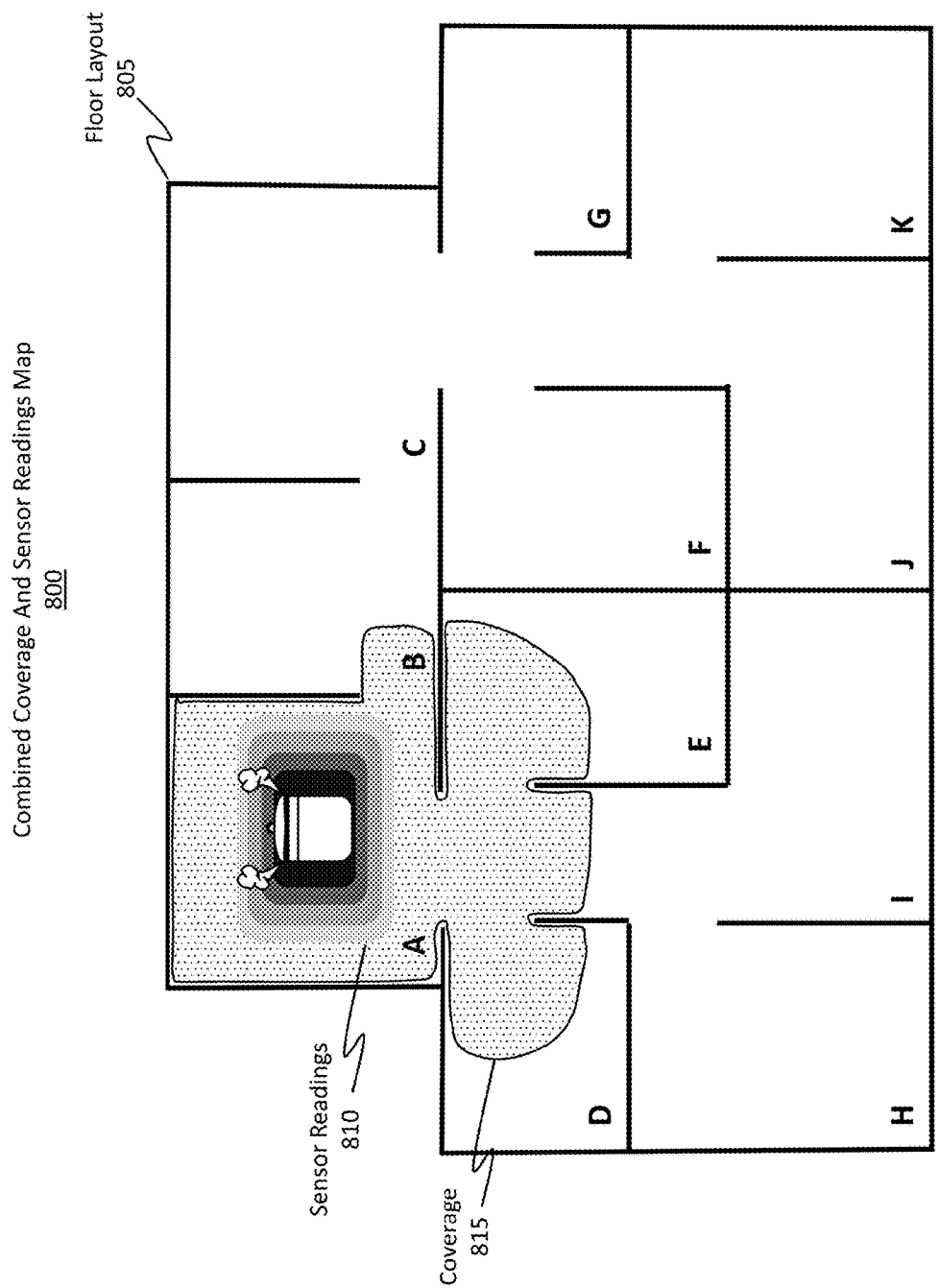
FIG. 8 illustrates an example illustration of a combined coverage and sensor readings map relative to the layout of a particular environment.

FIG. 8 shows a hybrid or a combination of the principles discussed thus far. Specifically, FIG. 8 shows a combined coverage and sensor readings map 800. Similar to the earlier maps, the combined coverage and sensor readings map 800 is visualizing a floor layout 805 (i.e. when the map is displayed, a visualization of the floor layout is illustrated), which is representative of the same floor layouts discussed earlier. In room A, there is a hot pot and a temperature sensor (not shown). Here, the combined coverage and sensor readings map 800 is rendering a first visualization corresponding to the sensor readings 810 provided by the temperature sensor IOT device (i.e. representative of sensor readings 410 from FIG. 4) and a second visualization corresponding to the estimated coverage 815 (i.e. representative of coverage 615 from FIG. 6). This combined coverage and sensor readings map 800 can be displayed as a mini-map within an HMD's FOV, or it can be switchable in the manner described earlier.

Figure 9:
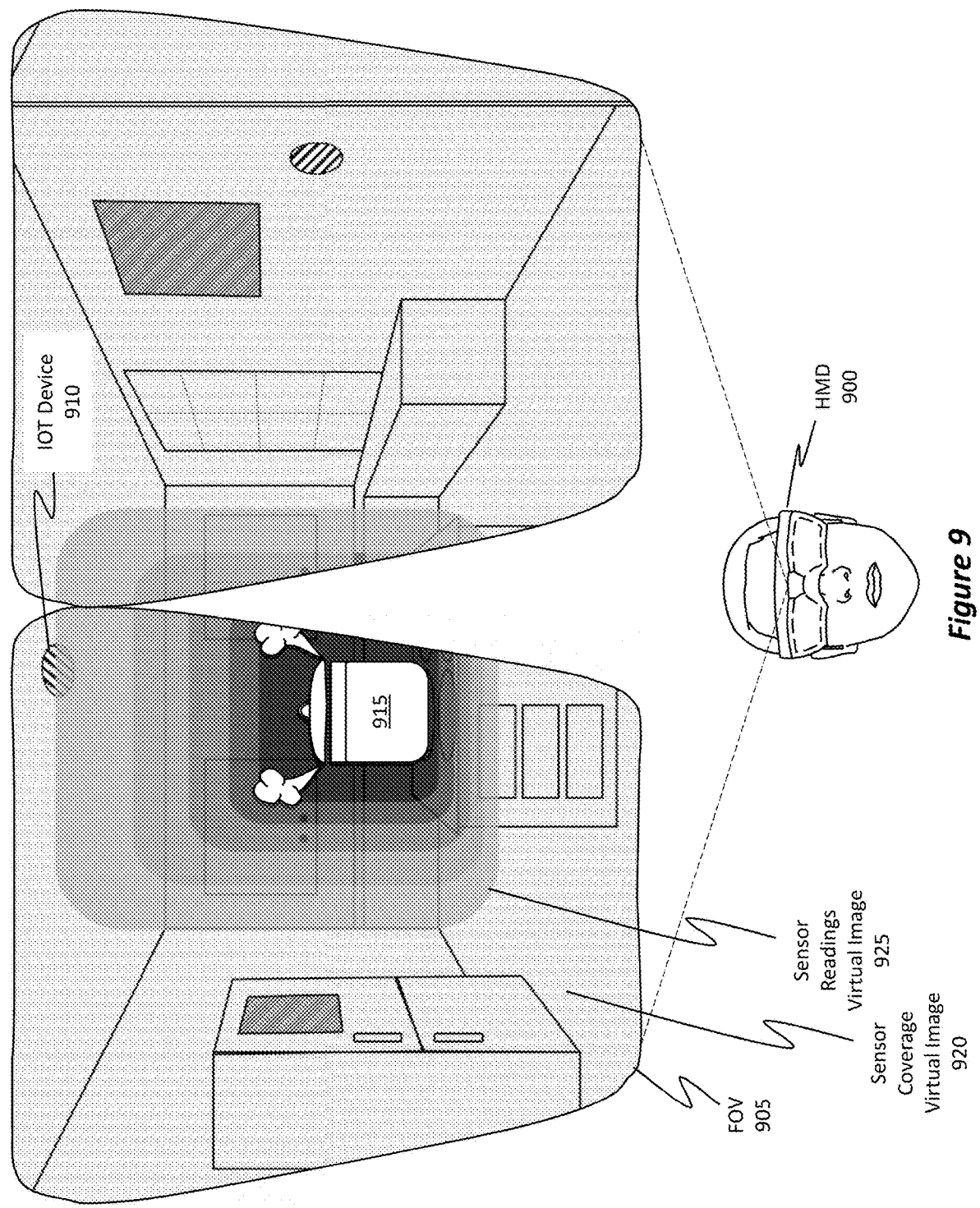
FIG. 9 illustrates a holographic visualization of an IOT device's combined sensor coverage area and sensor data, as visualized by an HMD.

FIG. 9 shows an HMD 900 that includes a FOV 905 in which room A is displayed. IOT device 910, which is representative of the IOT devices in the earlier examples, and pot 915 (also representative of the earlier example pots) are also shown. HMD 900 is simultaneously displaying a sensor coverage virtual image 920, corresponding to coverage 815 from FIG. 8, and a sensor readings virtual image 925, corresponding to sensor readings 810. Accordingly, HMD 900 is able to display any number of virtual images. One or more images may correspond to the IOT device's sensor data while one or more other images may correspond to the estimated operational coverage area of the IOT device.

Re-Localizing IOT Devices and Updating Coverage Maps

Figure 10:
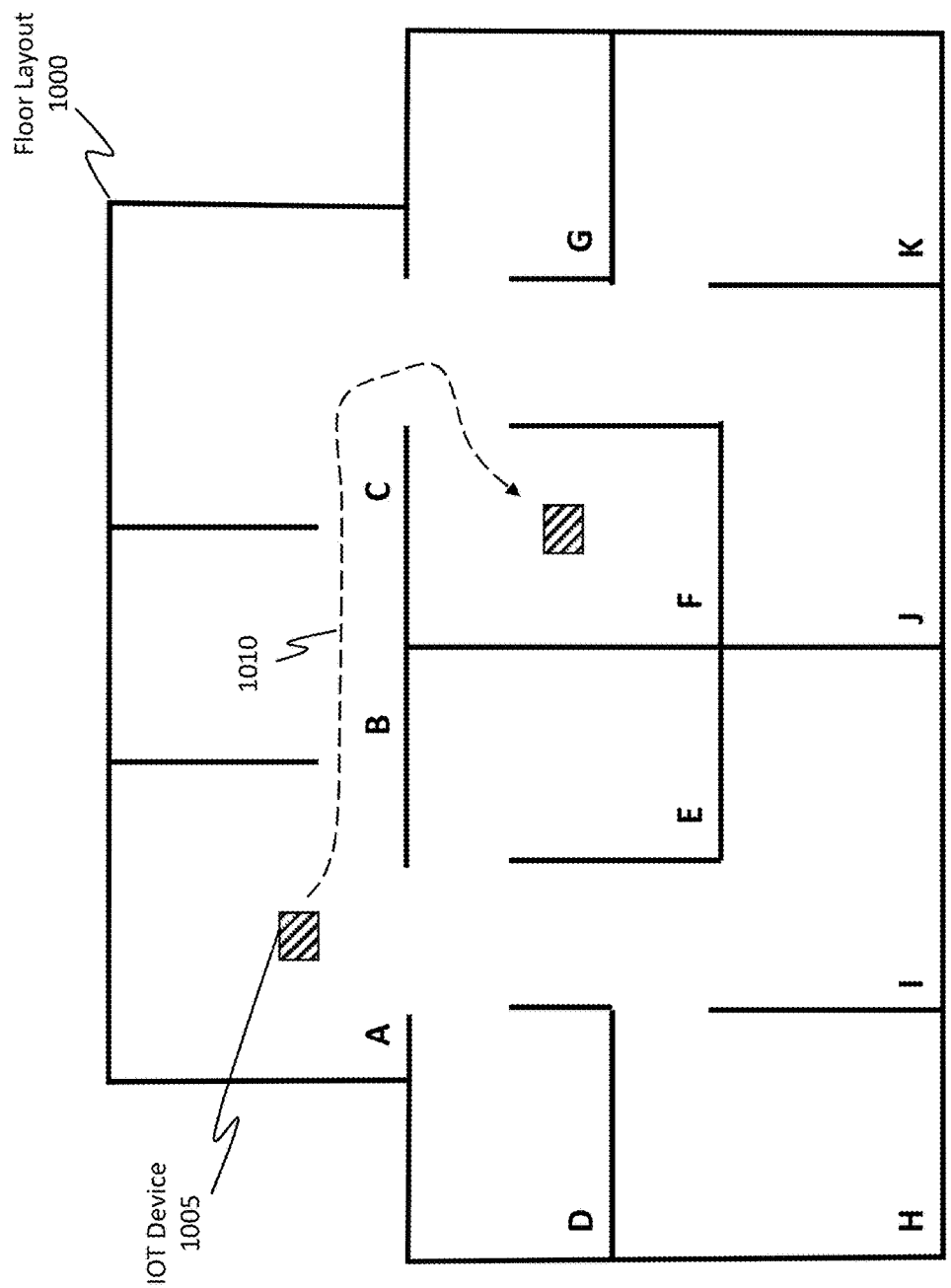
FIG. 10 illustrates how an IOT device can be moved to new a location.

Attention will now be directed to FIG. 10, which illustrates an example scenario where an IOT device is moved to a new location within an environment (or perhaps to an entirely new environment). Specifically, FIG. 10 shows a floor layout 1000, which is representative of the floor layouts discussed thus far and which includes rooms A through K. IOT device 1005 is initially located in room A, as described in the earlier examples. Now, however, IOT device 1005 is being moved 1010 to room F in floor layout 1000.

Figure 11:
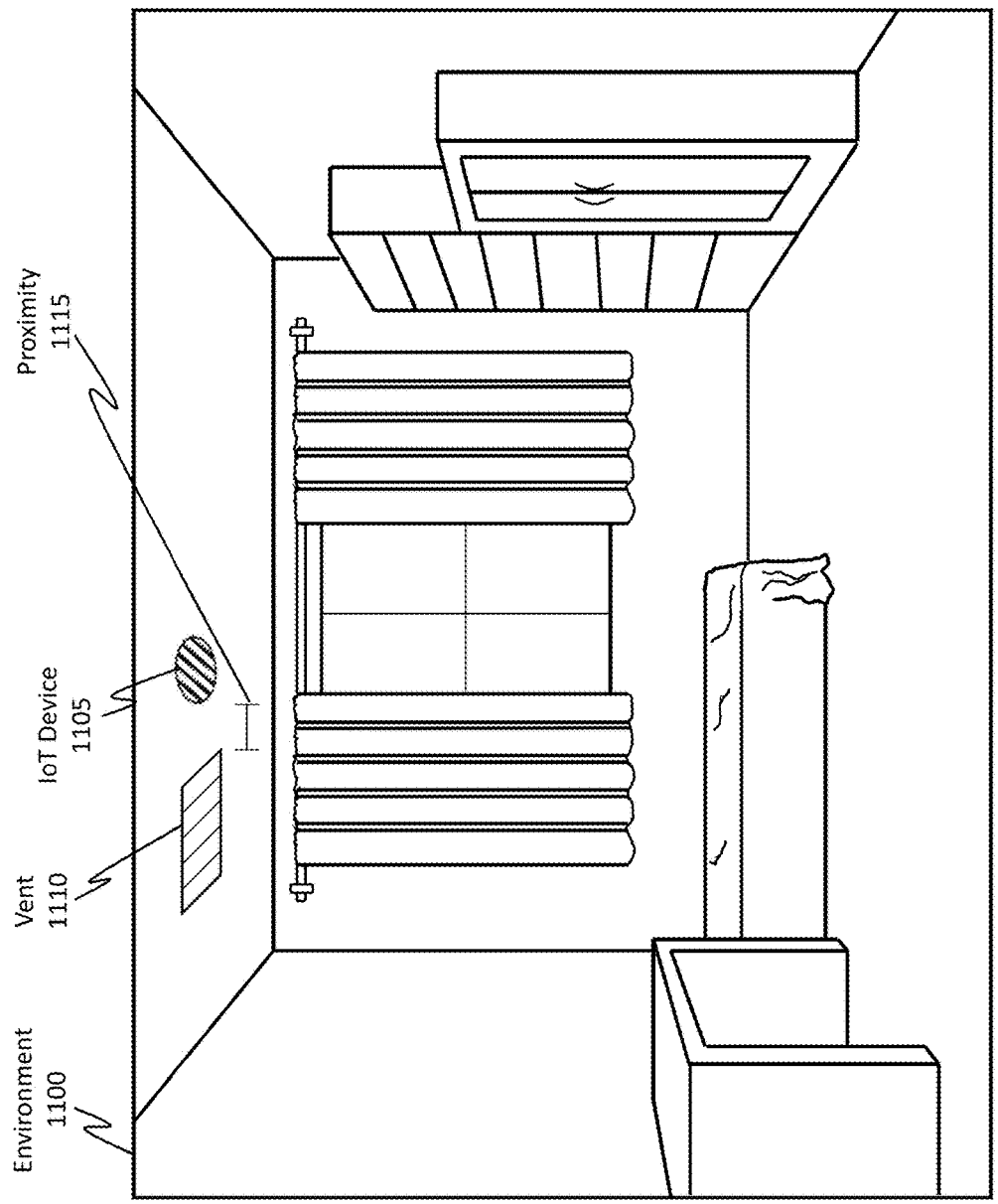
FIG. 11 illustrates an example environment in which an IOT device, after being moved, is now located.

FIG. 11 is representative of room F from FIG. 10 and shows an environment 1100 that includes different objects (e.g., a desk, bed, dresser, cabinet, windows, window drapes, etc.). Environment 1100 specifically includes IOT device 1105, which is representative of IOT device 1005 from FIG. 10 (i.e. the IOT device that moved from room A to room F) and an out-blowing air vent 1110. Notice, IOT device 1105 is positioned proximately to the vent 1110, as shown by proximity 1115. This positioning and its effects will be described in more detail later.

Now that IOT device 1105 has moved locations, the digital representation of the environment, the coverage map for the IOT device 1105, and the sensor readings map of the IOT device 1105 can all be updated to reflect the new position. Such updates can occur automatically and can be triggered automatically.

As described earlier, the IOT device's IMU can detect when the IOT device is being moved. In response to any movements, which are detectable by the IMU, the IOT device can send a message or indicator to the MR service to inform the MR service that the IOT device may have changed locations. Additionally, the IOT device's camera can capture new image data detailing/representing its new location.

That is, because the IOT device's environment (e.g., rooms A through K) has already been scanned and mapped in the form of a 3D digital representation, the new camera images can be used by the MR service to re-localize the IOT device. To clarify, the IOT device's cameras will capture images of its new location. These images can capture any number of reference or anchor points within the IOT device's new location. Once the MR service receives these new images, the MR service can then compare the anchor or reference points contained within the image data against its 3D digital representation of the environment. The MR service can then correlate, connect, or otherwise match the anchor or reference points identified in the IOT device's camera images against anchor or reference points maintained in the MR service's 3D digital representation. The results of these comparisons can be used to determine or identify the new location of the IOT device.

As a quick example with reference to FIG. 10, after IOT device 1005 is moved to room F, IOT device 1005 can begin capturing new images of room F. While it is being moved (as determined by an IMU or camera), IOT device 1005 can refrain from capturing images because those images will likely not accurately depict the IOT device's final placement location. For instance, IOT device 1005 is moved from room A to room B, then to room C, and finally to room F. Images of rooms B and C may not be useful with regards to determining IOT device 1005's final location. As such, IOT device 1005 can wait a predetermined time after its IMU or camera detects a final movement. Once the time period elapses, then IOT device 1005 can start capturing images of its new location.

By way of additional clarification, subsequent to no new movement data being generated by the IOT device's IMU or camera, the IOT device can wait a predetermined time period (e.g., a few minutes, hours, or perhaps even days) before it starts to capture new images of its new environment. After the predetermined time period elapses, then the IOT device 1005 can transmit new images to the MR service, where the new images capture features of room F (i.e. environment 1100 from FIG. 11). The MR service can then use the new images to determine IOT device 1005's new location (i.e. "re-localize" IOT device 1005).

Figure 12:
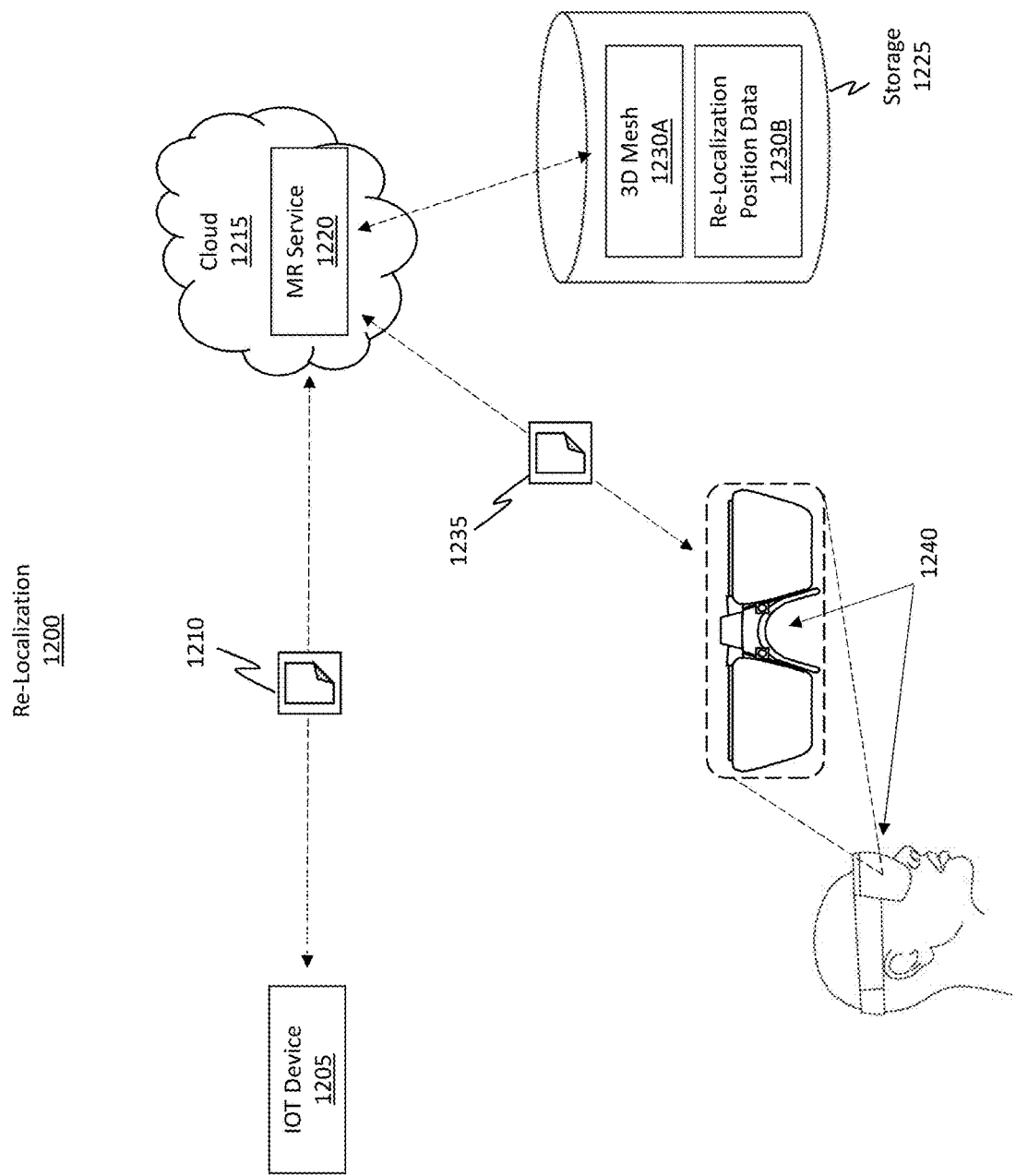
FIG. 12 illustrates an example technique for re-localizing an IOT device after it has been moved to a new location.

FIG. 12 shows an example of a re-localization 1200 process that may be performed to enable the MR service to identify the IOT device's new location. Specifically, FIG. 12 shows an IOT device 1205, which is representative of IOT device 1105 from FIG. 11. In response to changing environments or locations (e.g., going from room A to room F), IOT device 1205 transmits new data 1210 to the cloud 1215, which is operating an MR service 1220. MR service 1220 is representative of the other MR services discussed earlier and is operating on a server in the cloud 1215.

Data 1210 can include IMU data, image data, new sensor data, and/or any other data collected by IOT device 1205. MR service 1220 receives data 1210 and then updates information included within its storage 1225. For instance, MR service 1220 can update its 3D mesh 1230A of the environment (e.g., a 3D representation of the environment). Additionally, MR service 1220 can update a coverage map and/or a sensor readings map associated with the IOT device (as illustrated in FIG. 2).

Accordingly, MR service 1220 can be configured to determine re-localization position data 1230B for an IOT device in response to receiving image data (or other data) from the IOT device. The re-localization position data 1230B describes the new location of the IOT device 1205 (e.g., by including camera data, sensor data, GPS data, IMU data, etc.). Furthermore, in response to determining the re-localization position data 1230B for IOT device 1205, the MR service 1220 can update a coverage map associated with the IOT device, where the coverage map describes an operational coverage area for the IOT device (i.e. the coverage map digitally represents the operational coverage area).

Additionally, MR service 1220 can push, publish, or transmit updated data 1235 to an HMD 1240 to notify the HMD 1240 of the IOT device 1205's new location. Here, HMD 1240 is representative of the HMDs discussed earlier.

Figure 13:
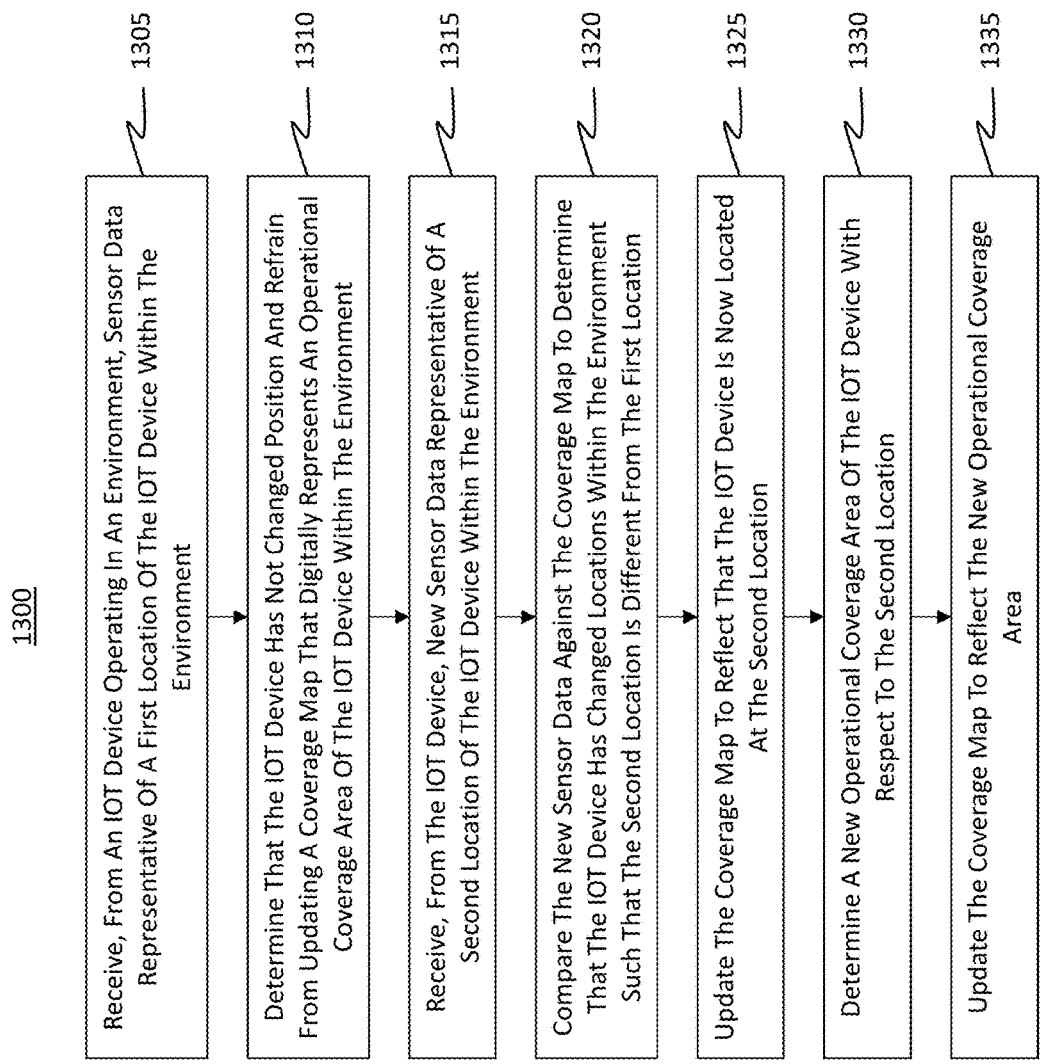
FIG. 13 illustrates a flowchart of an example method for re-localizing an IOT device after it has been moved and for updating the IOT device's coverage map to reflect its new position.

FIG. 13 illustrates a flowchart of an example method 1300 describing the processes of FIG. 12. Method 1300 can be performed by the MR service 1220.

Initially, method 1300 includes an act 1305 of receiving, from an internet-of-things (IOT) device (e.g., IOT device 1005 from FIG. 10) operating in an environment (e.g., the environment that includes rooms A through K), sensor data describing (i.e. is representative of) a first location (e.g., room A) of the IOT device within the environment. In response to receiving the sensor data, there is an act 1310 of determining that the IOT device has not changed positions. Consequently, the MR service refrains from updating a coverage map that records, or rather that digitally represents, an operational coverage area of the IOT device within the environment. Currently, the coverage map accurately reflects the actual operational coverage area of the IOT device. As such, there is no need to update the map.

Subsequently, method 1300 includes an act 1315 of receiving, from the IOT device, new sensor data (e.g., data 1210 from FIG. 12) that either (i) describes or digitally represents a second location (e.g., room F) of the IOT device or (ii) at least provides a notification (i.e. includes notification data) that the IOT device may have moved. Regarding the first aspect, the second location can be described via camera images, GPS data, or other triangulation data (e.g., telecommunications triangulation or perhaps router triangulation).

Regarding the second aspect, the sensor data may not specifically describe/represent the second location, but instead it may simply provide an indication that the IOT device has been moved. For instance, the sensor data may include only IMU data indicating the IOT device has been moved. In other cases, the sensor data may not include either image data or IMU data, but instead it may include newly sensed data that varies significantly from data previously collected. As a result of this stark variance or difference (e.g., satisfying a difference threshold) between old sensor data and new sensor data, the IOT device may have determined that it has been moved to a new location having different conditions than the old location. Accordingly, if the variance between past sensor data and new sensor data satisfies a particular threshold, the IOT device may be triggered to send an indication to the MR service to inform the MR service there is a chance that the IOT device has been moved to a new location. If the notification data includes image data, then the MR service can automatically update its records to identify the new location. On the other hand, if the notification data does not include image data, then the MR service can issue an alert to an administrator to inform him/her that the IOT device should be found and perhaps scanned via scanning sensors.

Returning to FIG. 13, method 1300 also includes an act 1320 of comparing the new sensor data (e.g., which may include image data) against the coverage map to determine that the TOT device has changed locations such that the second location is different from the first location. As described earlier, the image data may include reference or anchor points. These reference or anchor points can be compared against reference or anchor points included within the coverage map to determine the new location of the IOT device. Accordingly, in some embodiments, the sensor data includes image data describing (i.e. digitally representing) the location of the IOT device within the environment. When the MR service receives this data, then the MR service may be configured to use the image data to determine whether the location of the IOT device has changed by comparing the image data against location data of the IOT device included within a digital representation of the environment, the coverage map, or possibly even the sensor readings map.

Method 1300 then includes an act 1325 of updating the coverage map to reflect that the TOT device is now located at the second location. Additionally, method 1300 includes an act 1330 of determining, deriving, estimating, or deducing a new operational coverage area of the IOT device with respect to the second location. This process can be performed in the manner described earlier (e.g., by analyzing operational characteristics of the device relative to the characteristics of its surrounding environment). Finally, method 1300 includes an act 1335 of updating the coverage map to reflect the new operational coverage area. FIGS. 14 through 19 provide additional clarification regarding the method acts of method 1300.

Figure 14:
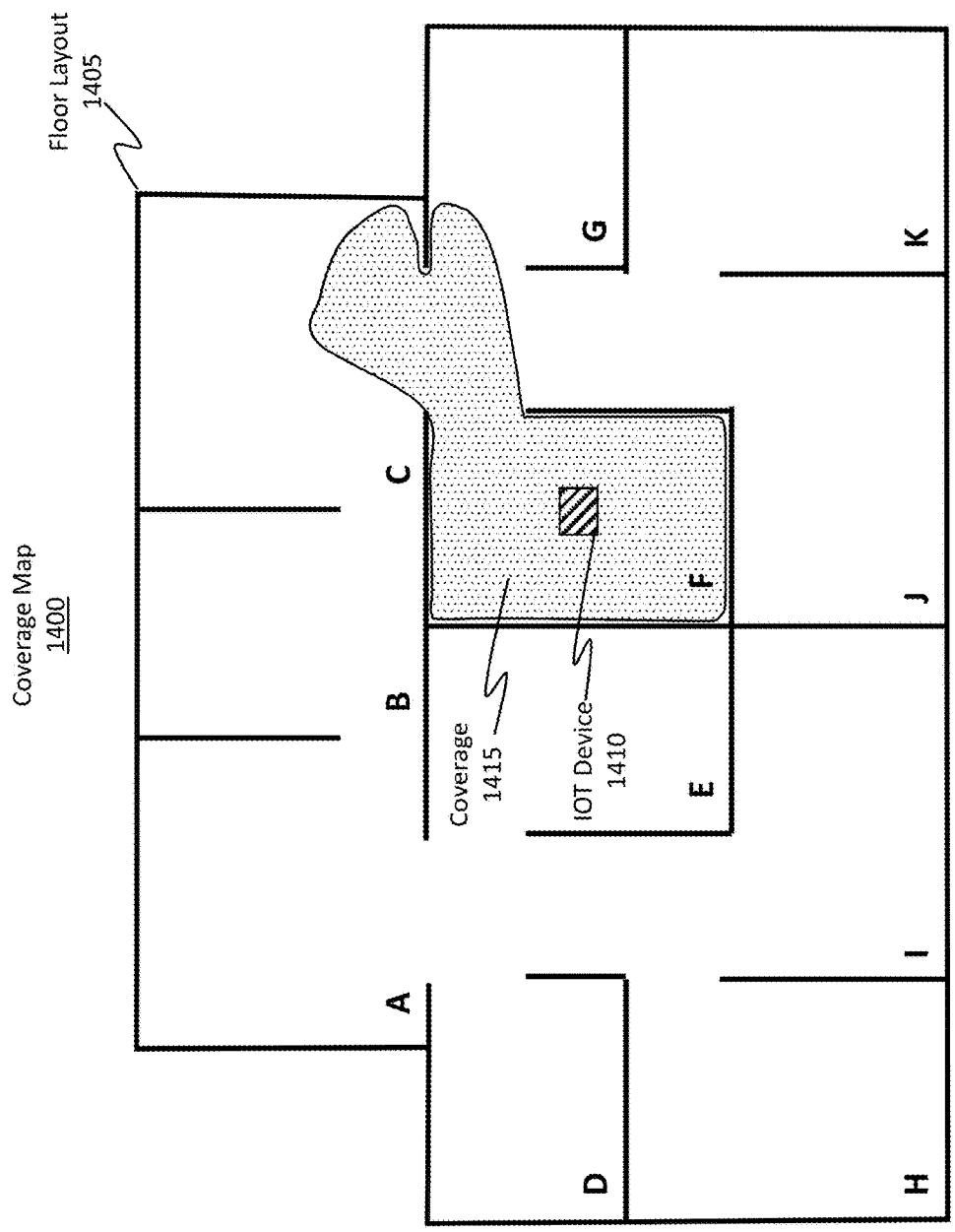
FIG. 14 illustrates a new operational coverage area for the IOT device while positioned at its new location.

FIG. 14 shows an updated coverage map 1400 depicting a floor layout 1405, an IOT device 1410, and a newly estimated coverage 1415 of IOT device 1410. In particular, IOT device 1410 was moved from room A to room F. Coverage map 1400 identifies (i.e. includes data representative of) IOT device 1410 at the second location within floor layout 1405. Optionally, the coverage map 1400 can include a three-dimensional (3D) representation corresponding to the second location (i.e. room F) and can identify IOT device 1410 at the second location relative to the 3D representation.

In response to the IOT device's movement, the MR service calculated a new estimated coverage 1415 of IOT device 1410. This new coverage 1415 is dependent on the characteristics of the new room F in which IOT device 1410 is now located. Specifically, the entirety of room F is now included in coverage 1415, and coverage 1415 also at least partially extends into rooms C and G, which are adjacent to room F. As described earlier, the estimated coverage 1415 can be computed based on the operational characteristics of the IOT device 1410 as well as the characteristics of the environment in which IOT device 1410 is located.

Figure 15:
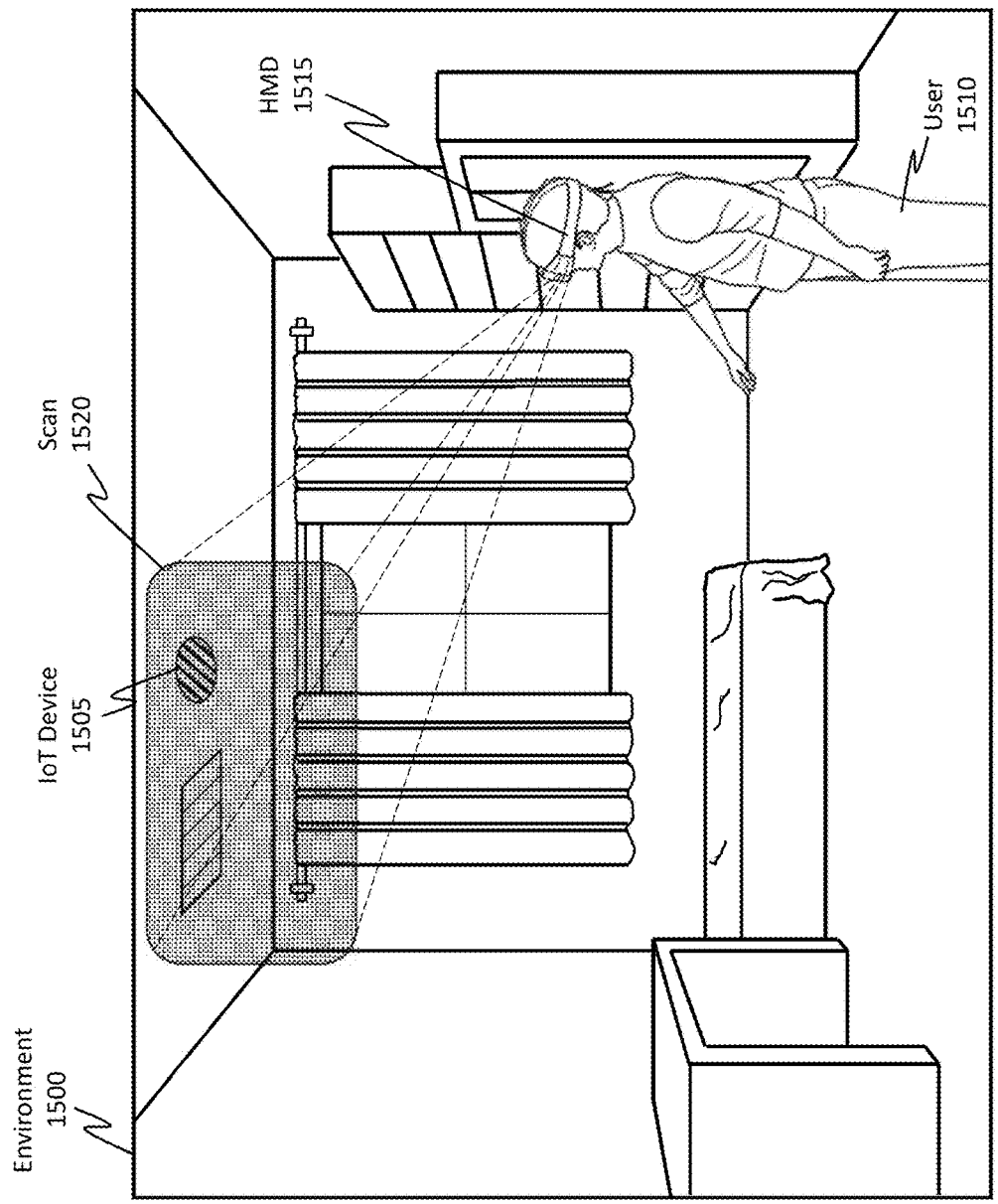
FIG. 15 illustrates how an HMD is able to scan an environment to identify the presence of an IOT device. Scanning the environment also allows the HMD and/or a mixed-reality (MR) service to determine whether the IOT device's position should be moved so as to improve the IOT device's performance (e.g., placing an IOT fire alarm or temperature sensor next to an out-blowing air vent may adversely impact the IOT device's performance).

FIG. 15 illustrates a scenario in which an HMD is being used to identify and scan an IOT device after it has been moved. There may be scenarios in which the MR service is not provided with image data, such that the MR service is not able to immediately determine the IOT device's new location. In response, the MR service may raise an alert to inform an administrator that he/she should go identify and scan the IOT device's new location.

FIG. 15 shows an example environment 1500 that includes an IOT device 1505. Here, a user 1510 is wearing an HMD 1515. HMD 1515 is being used to scan 1520 environment 1500 to identify IOT device 1505. Therefore, even if IOT device 1505 does not provide image data representative of its new location to the MR service, the MR service can still learn of the new location through the use of HMD scanning data. Scanning can be performed to identify the IOT device, where the scanning process can include one or more of the following: (i) scanning an identifier affixed to the IOT device, where the identifier is then used to identify the IOT device or (ii) scanning the IOT device and then semantically segmenting the IOT device to identify the IOT device. These aspects will now be described in more detail.

Figure 16:
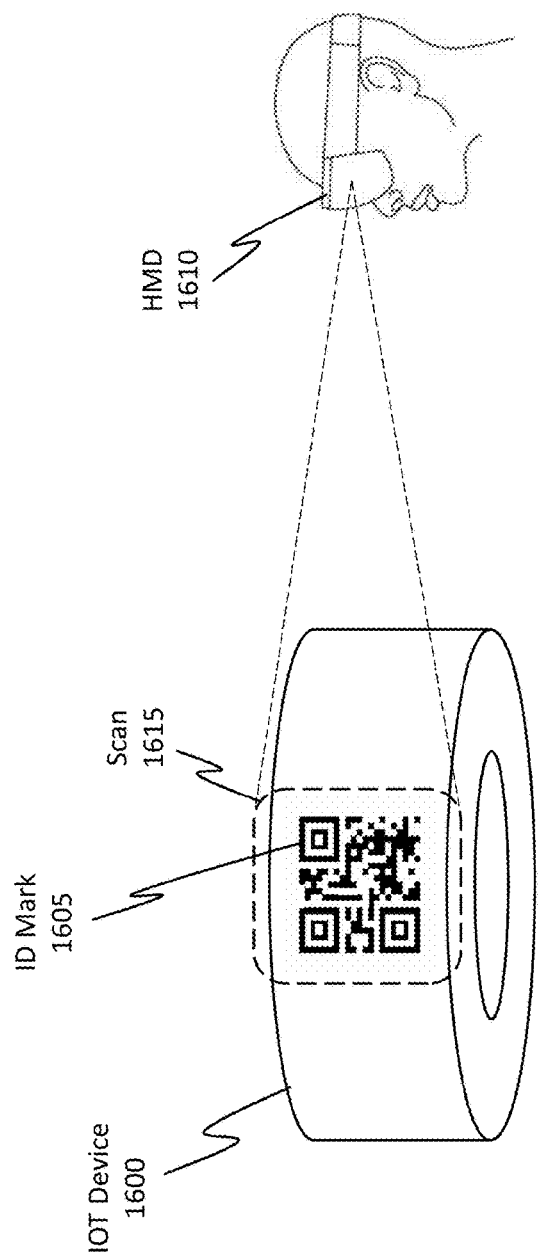
FIG. 16 illustrates an example technique for identifying an IOT device by causing an HMD to scan an ID mark on the IOT device.

In some cases, as shown in FIG. 16, an IOT device 1600 includes an identifying ID mark 1605 (e.g., a QR code, bar code, or even something as simple as a serial number). An HMD 1610, when scanning a room (as shown by scan 1615), can identify IOT device 1600 via ID mark 1605. That is, the MR service can include a repository or database of identifying information associated with any number of IOT devices. After scanning ID mark 1605, HMD 1610 can transmit the scanned ID mark 1605 to the MR service so the MR service can then lookup the identify of this particular IOT device within the database. Once identified, then the MR service can update the IOT device 1600's coverage map and sensor readings map to reflect the IOT device 1600's new location.

It may be the case, however, that an IOT device does not have an ID mark or the ID mark may not be readily visible. In such scenarios, an HMD can be used to scan an environment and then a semantic segmentation process can be performed on the scanned data (e.g., either by the HMD or by the MR service). The semantic segmentation process can identify the IOT device via its semantically scanned features (e.g., the shape and/or features of the device can be identified and then an Internet or other type of search can be performed to identify which devices share that same shape). Once the IOT device is identified, then the scanning data can also be used to determine the IOT device's location. Such an example is provided in FIG. 17.

Figure 17:
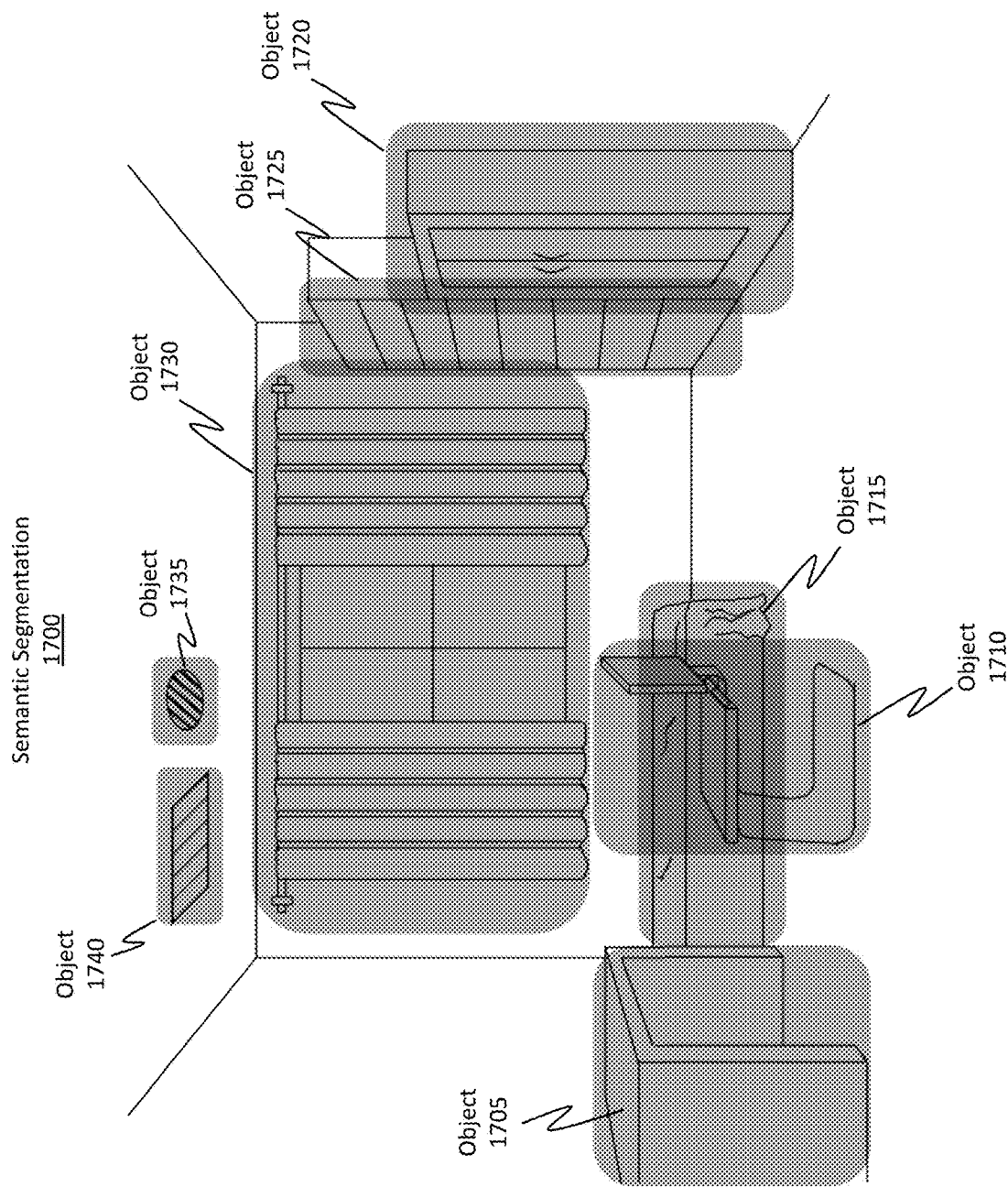
FIG. 17 illustrates another example technique for identifying an IOT device by causing an HMD to scan a room and by causing semantic segmentation to be performed on the scanning data to identify the IOT device within the room.

Specifically, FIG. 17 shows an example of a semantic segmentation 1700 process in which an environment is being scanned via any number of scanning sensors (e.g., scanning sensors on an HMD). The scanning data is then processed (e.g., perhaps by a machine learning component or engine) to characterize each pixel of the scanning data. In FIG. 17, the pixels have been classified as corresponding to different objects, or object types. For example, FIG. 17 shows how object 1705 (i.e. the desk) is distinct from objects 1710 (i.e. the chair), 1715 (i.e. the bed), 1720 (i.e. the closet), 1725 (i.e. the dresser), 1730 (i.e. the window), 1735 (i.e. the IOT device), and 1740 (i.e. an air vent). Accordingly, the IOT device can be identified by performing semantic segmentation on scanning data.

Figure 18:
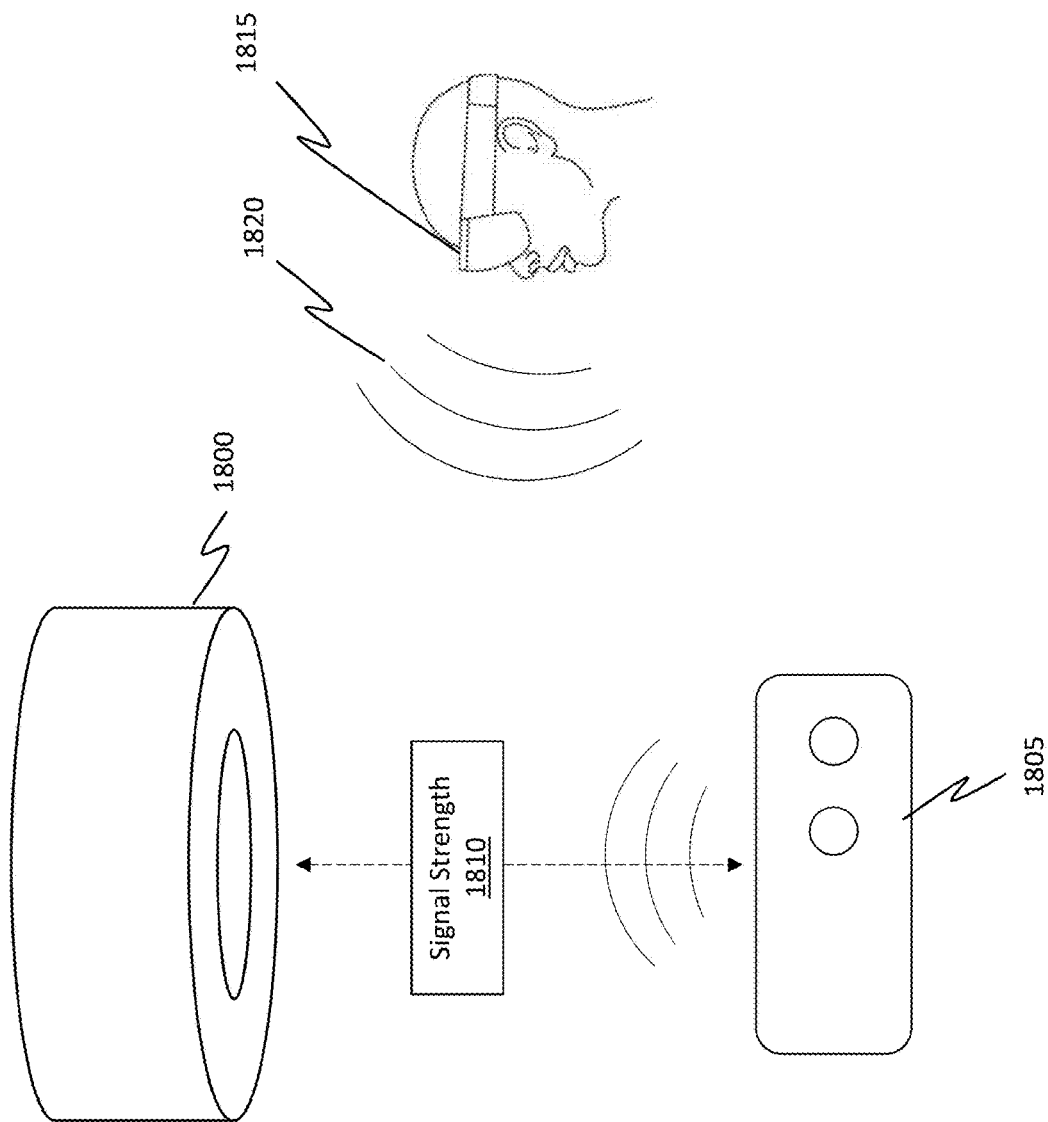
FIG. 18 illustrates an example technique for triangulating or otherwise determining the approximate location of an IOT device by intercepting or detecting the IOT device's signal connection strength relative to another computing device.

In some cases, as shown in FIG. 18, an IOT device can be located by triangulating its position relative to one or more other wireless devices. Specifically, FIG. 18 shows an IOT device 1800 communicating with a wireless router 1805 and having a particular signal strength 1810. HMD 1815 can intercept or otherwise detect 1820 the signal strength 1810 as well as the signal strength between the IOT device and any other wireless device in order to triangulate the location of IOT device 1800. Consequently, IOT device 1800's new location can be identified in this manner as well. Accordingly, sensor data used to identify an IOT device can include any one or combination of the following data sets: (i) image data capturing or corresponding to one or more image(s) of the environment, (ii) signal strength data between an IOT device and another device located within the environment, or even (iii) IMU data representative of movement.

Figure 19:
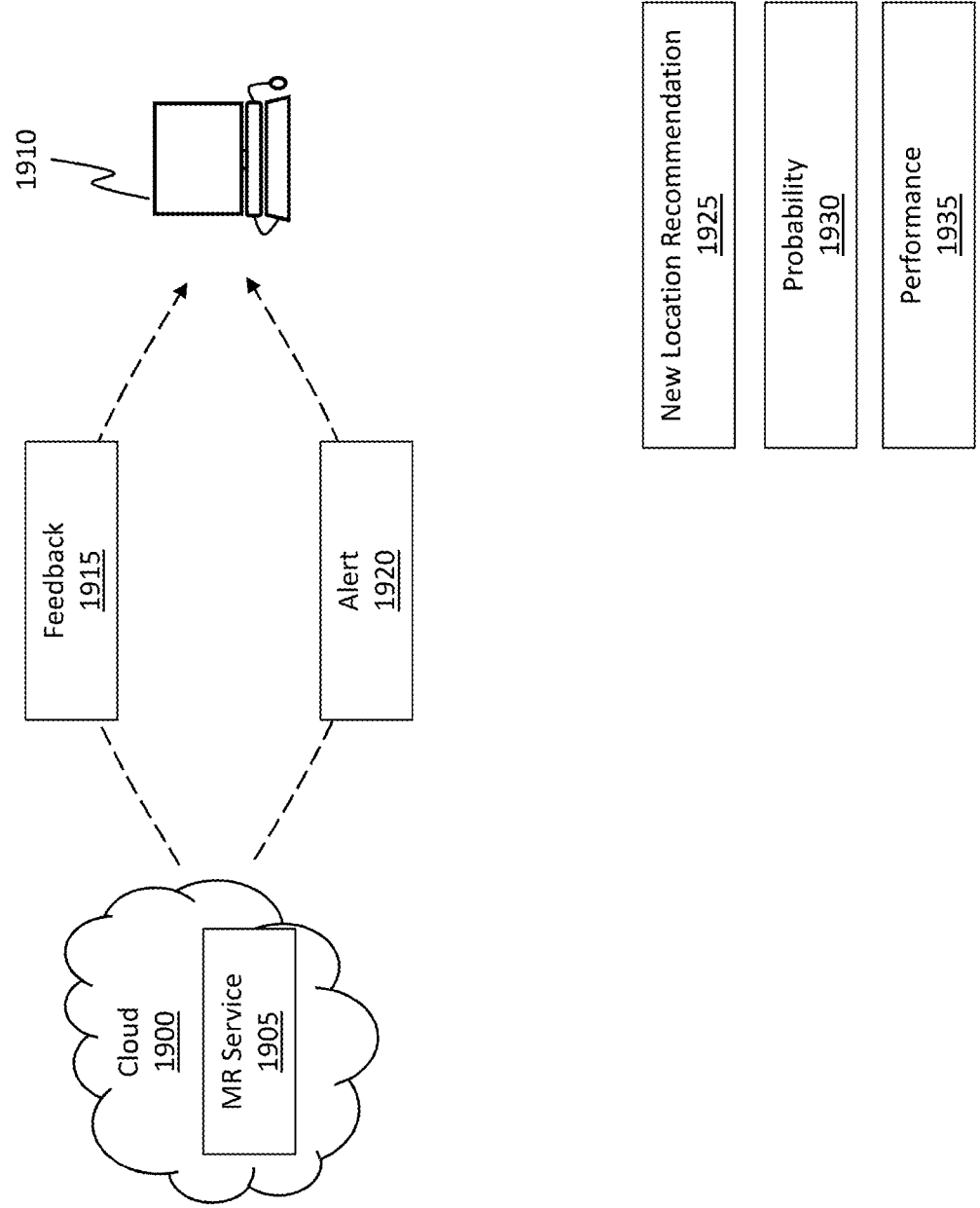
FIG. 19 illustrates how an MR service, after analyzing the location of an IOT device, is able to raise an alert or provide feedback to notify an administrator that the position of the IOT device should be moved so as to improve the IOT device's performance within an environment.

FIG. 19 shows an example scenario in which an MR service can raise an alert to inform an administrator that the performance of an IOT device can be improved if it were relocated to a new position. Specifically, FIG. 19 shows a cloud 1900 operating an MR service 1905, which is representative of the MR services discussed thus far.

Here, MR service 1905 has analyzed the current position of an IOT device (e.g., by analyzing the digital representation 245A of FIG. 2, coverage map 250B, sensor readings map 250C, HMD scanning data, or any other information used to identify the IOT device's location) and determined that the performance of the IOT device can be improved if it were moved to a new location. Consequently, MR service 1905 can generate and send feedback 1915 and/or an alert 1920 to an administrator 1910. The provided data (e.g., feedback 1915 or alert 1920) can include a new location recommendation 1925, which identifies a new location where the IOT device will operate better, and/or a probability 1930, which will be described momentarily. The provided data can indicate how the performance 1935 of the IOT device can be improved if it were moved to a new location.

Using environment 1100 from FIG. 11 as an example, IOT device 1105 is positioned proximately to the out-blowing air vent 1110. As described earlier, IOT device 1105 may be a temperature sensor. When the out-blowing air vent 1110 blows air outward, the air may impede, disrupt, impact, or otherwise obstruct the temperature sensing abilities of IOT device 1105. For instance, IOT device 1105 may not be able to accurately identify the temperatures in environment 1100 when air is blown near its sensor. In any event, by analyzing the attributes of environment 1100 and by analyzing possibly even the IOT device's coverage map and sensor readings map, MR service 1905 from FIG. 19 can determine that the performance 1935 of the IOT device can be improved by being moved to a new position within its current environment.

As an additional example, a sensor readings map can show how the IOT device's sensor measurements change (perhaps dramatically or perhaps beyond a particular threshold) each time air blows through the vent. The sensor readings can return to a normal reading after the air stops blowing. By identifying these variations in historical data, the MR service can determine that the IOT device's proximity to the vent is adversely impacting the IOT device's operational capabilities. As such, the MR service can provide a new location recommendation 1925 to the administrator 1910 to inform the administrator 1910 that the IOT device should be relocated, perhaps to a remote location relative to the vent.

As an additional example, a digital representation of the environment may describe or digitally represent semantically segmented objects (e.g., the vent, the desk, and so on) located within the environment as shown in FIG. 17. Here, the MR service may be further configured to determine a relative proximity (e.g., proximity 1115 in FIG. 11) between the IOT device and one of the semantically segmented objects (e.g., object 1740 in FIG. 17). The MR system can then determine a probability (e.g., probability 1930 in FIG. 19) that the relative proximity of the IOT device to the semantically segmented object will negatively impact a performance 1935 of the IOT device. In response to determining that the probability exceeds a threshold limit indicating that the performance 1935 of the IOT device will be negatively impacted as a result of the relative proximity (i.e. the performance is likely to be below a performance threshold), the MR service can send an alert (e.g., alert 1920) to indicate that the IOT device should be moved to a new location.

As yet another example, an HMD can also receive (e.g., from the MR service 1905 in FIG. 19) the new location recommendation 1925. This new location recommendation 1925 can identify a new location for the IOT device (i.e. the recommendation includes data representative of an identification of the new location), where the new location is selected based on a determination that a predicted performance of the IOT device will be higher at the new location as compared to a current performance of the IOT device at an existing location. Thereafter, the HMD can render a virtual image identifying the new location so as to guide a user to that proposed location for additional inspection or approval by the user. Of course, these are examples only, and the principles disclosed herein should be interpreted broadly.

Example Computer System(s)

Figure 20:
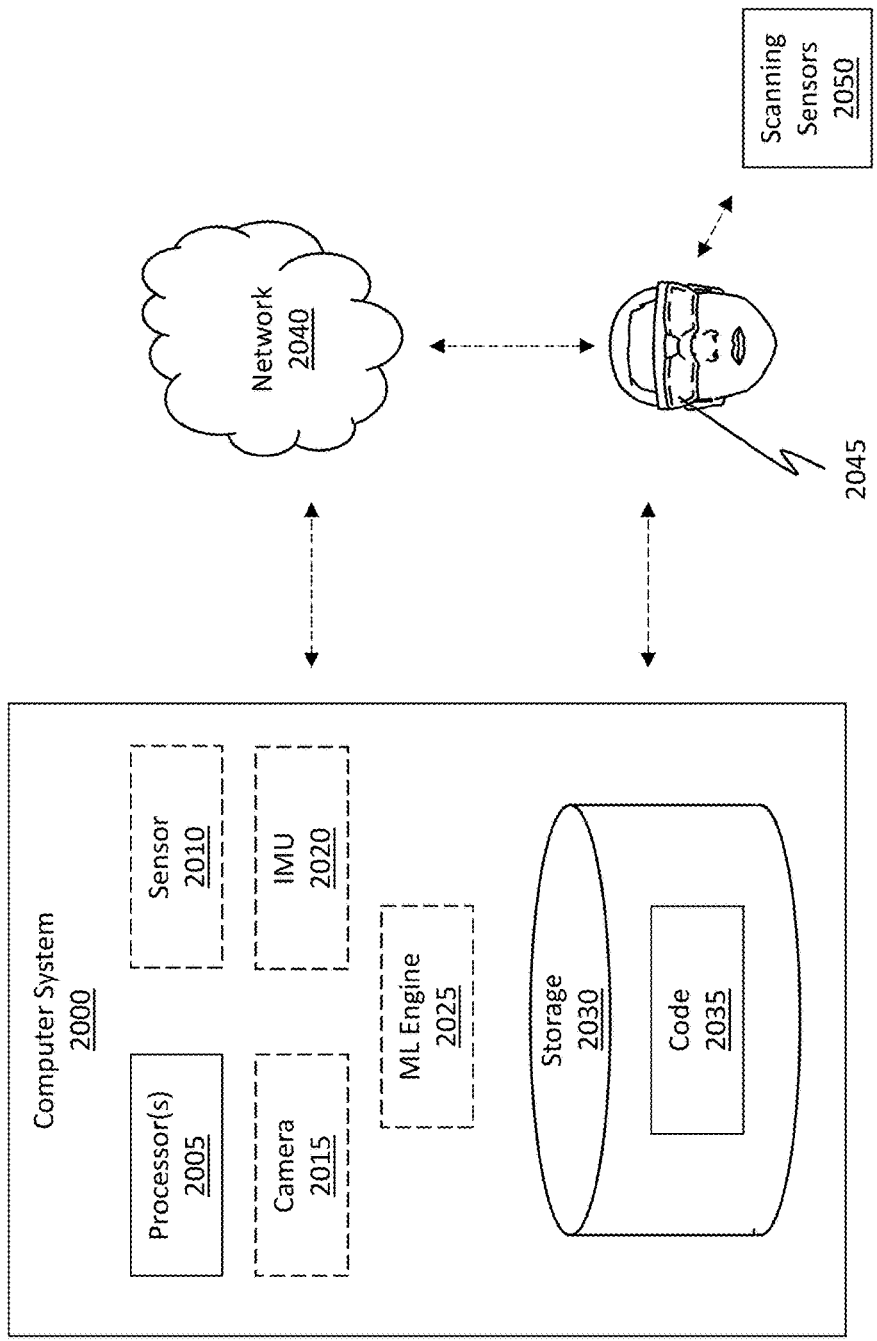
FIG. 20 illustrates an example computer system capable of performing any of the disclosed operations.

Attention will now be directed to FIG. 20 which illustrates an example computer system 2000 that may include and/or be used to perform the operations described herein. In particular, this computer system 2000 may be in the form of the MR systems/devices, computer systems, HMDs, or perhaps the IOT devices that were described earlier.

Computer system 2000 may take various different forms. For example, computer system 2000 may be embodied as a tablet, a desktop, an IOT device, a central server operating an MR service, or an HMD (with a corresponding wearable display), such as those described throughout this disclosure. As described throughout this disclosure, an HMD is a complex computing device that includes any number of processors, GPUs, and other processing units to perform both serial and parallel processing. The HMD also includes features such as a head mountable display screen and customizable (i.e. form fitting) features for placing the HMD on a user's head. The HMD is typically not limited in its ability to connect to a wireless network nor is the HMD typically throttled or otherwise restricted in how it uses that network. In this regard, an HMD is often considered to be a high priority device that is given preference to resources or bandwidth as compared to other types of devices. HMDs also typically have robust security features to ensure the HMD is protected from threats such as viruses, malware, and other hacking attacks. HMDs are also able to provide complex visualizations, such as holograms and other virtual images. These complex visualizations can dynamically change in response to external stimuli in the HMD's environment such that the visualizations can be dynamically reactive to unpredictable or unforeseen new conditions (i.e. the state machine of an HMD is highly dynamic and can respond in real-time to new and unanticipated conditions). Accordingly, the HMD is configured to display virtual images on a wearable display and is configured to update the virtual images in real-time and in response to any number or type of unanticipated, unforeseen, or unprogrammed external stimuli (e.g., the geometries of a new room in which the HMD is placed were not previously known to the HMD, nevertheless, the HMD is able to display and update virtual images relative to the new room).

In some embodiments, though not necessarily all, IOT devices are lower priority devices that are not given preference to resources or bandwidth as compared to other types of devices. When resources or bandwidth are scarce or limited, then IOT devices typically will be throttled or otherwise restricted in how they use a network. In this regard, the priority of an IOT device is typically lower than that of other types of devices. IOT devices also often have fewer security measures in place to protect them from viruses, malware, and other hacking attacks. Although some IOT devices may be able to provide unique user interfaces and visualizations, these visualizations are often preconfigured and do not deviate from established states (i.e. the state machine of an IOT device is typically limited to a few preconfigured options and typically do not include programming to enable the IOT device to respond to new and unanticipated conditions). In this regard, IOT devices typically follow a preconceived, rigid, or set course of action such that IOT devices typically are not able to respond to any number or any type of unanticipated, unforeseen, or unprogrammed external stimuli (i.e. the IOT device will typically follow only a set protocol or procedure and will respond only to anticipated, programmed, or foreseen responses and stimuli).

Computer system 2000 may also be a distributed system that includes one or more connected computing components/devices that are in communication with computer system 2000, a laptop computer, a mobile phone, a server, a data center, and/or any other computer system. Other system subcomponents may be included or attached with the computer system 2000, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments. Some of the embodiments are implemented as handheld devices or handheld depth cameras. Some embodiments are also operable in robotics, drones, ambient settings, autonomous vehicles, and any type of mobile phone.

In its most basic configuration, computer system 2000 includes various different components. FIG. 20 shows that computer system 2000 includes at least one processor(s) 2005 (aka a "hardware processing unit"). In some cases, computer system 2000 may also include a sensor 2010, a camera 2015, an IMU 2020, and a machine learning (ML) engine 2025. Computer system 2000 also includes storage 2030.

If computer system 2000 includes input/output (I/O), then the I/O may include any number of input/output devices, including wearable or handheld devices. I/O may also include a wearable display, which may be used to render virtual content. Camera 2015 (e.g., a scanning sensor) may include any number of scanning sensors or depth cameras, including head tracking sensors, hand tracking sensors, depth detection sensors, or any other type of depth camera. These depth cameras may be configured in the manner described earlier to scan an environment to generate 3D scanning data.

IMU 2020 may be configured in the manner described earlier. Additionally, the ML engine 2025 may be configured to perform any of the machine learning functions described earlier.

Storage 2030 is shown as including executable code/instructions 2035. The executable code/instructions 2035 represent instructions that are executable by computer system 2000 to perform the disclosed operations, such as those described in the methods disclosed herein.

Storage 2030 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well. As used herein, the term "executable module," "executable component," or even "component" can refer to software objects, routines, or methods that may be executed on computer system 2000. The different components, modules, engines, and services described herein may be implemented as objects or processors that execute on computer system 2000 (e.g. as separate threads).

The disclosed embodiments may comprise or utilize a special-purpose or general-purpose computer including computer hardware, such as, for example, one or more processors (such as processor(s) 2005) and system memory (such as storage 2030), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical/hardware computer-readable storage media/device(s). Computer-readable media that carry computer-executable instructions are transmission media. Thus, by way of example and not limitation, the current embodiments can comprise at least two distinctly different kinds of computer-readable media: computer storage media/device(s) and transmission media.

Computer storage media are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras, accelerometers, gyroscopes, acoustic sensors, magnetometers, etc.) or devices/HMDs via a network 2040. For example, computer system 2000 can communicate with a central cloud MR service located in the cloud.

During use, a user of computer system 2000 may be able to perceive information (e.g., an MR scene/environment (including VR or AR)) through a display screen that is included with the I/O of computer system 2000 and that is visible to the user. The I/O and sensors with the I/O also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the mixed-reality environment.

A graphics rendering engine may also be configured, with processor(s) 2005, to render one or more virtual objects within an MR scene. As a result, the virtual objects accurately move in response to a movement of the user and/or in response to user input as the user interacts within the virtual scene.

A "network," like the network 2040 shown in FIG. 20, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2040. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer system 2000 is able to communicate with any number of other computing devices, such as an HMD 2045 that includes scanning sensor 2050. Of course, if computer system 2000 is itself an HMD, then it may also include scanning sensors 2050 as well.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor(s) 2005). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A server computer system configured to execute a mixed-reality (MR) service, said server computer system comprising:
one or more processor(s); and
one or more computer-readable hardware storage device(s) that store instructions that are executable by the one or more processor(s) to cause the server computer system to at least:
receive, from an internet-of-things (IOT) device operating in an environment, sensor data representative of one or more condition(s) monitored by the IOT device;
in response to receiving the sensor data, access a sensor readings map associated with the IOT device, the sensor readings map digitally representing the environment and including data representative of a location of the IOT device within the environment, the sensor readings map also including data representative of the one or more condition(s) monitored by the IOT device;
update the sensor readings map by attaching the sensor data to the sensor readings map;
determine a layout of the environment in which the IOT device is operating, the layout also reflecting the location of the IOT device within the environment; and
generate a combined map that includes a first visualization reflecting a coverage map and a second visualization reflecting the sensor readings map, wherein:
the coverage map reflects a limited operational coverage area of the IOT device based on the layout, the limited operational coverage area being a reduced-in-size version of an initially-determined operational coverage area, the limited operational coverage area being generated as a result of imputing a size-reducing buffer against the initially-determined operational coverage area and being generated to increase a likelihood of determining a real-world coverage area of the IOT device,
the limited operational coverage area starts at the IOT device and spans a determined distance away from the IOT device in the environment, and
the second visualization is structured to overlap at least a part of the first visualization in the combined map.

2. The server computer system of claim 1, the MR service also being configured to transmit at least some of the sensor data to a mixed-reality (MR) device that is either (i) physically operating within the environment or (ii) displaying a visualization of the environment.

3. The server computer system of claim 1, the sensor data also including measurement data obtained from a sensor of the IOT device such that the sensor readings map is also updated to include the measurement data and such that the server computer system includes updated information regarding sensed operational conditions of the IOT device.

4. The server computer system of claim 1, the sensor data also including image data captured by a camera of the IOT device.

5. The server computer system of claim 4, the MR service being further configured to:
in response to receiving the image data from the IOT device, determine re-localization position data for the IOT device.

6. The server computer system of claim 5, the MR service being further configured to:
in response to determining the re-localization position data for the IOT device, update the coverage map associated with the IOT device.

7. The server computer system of claim 1, the sensor data also including inertial measurement unit (IMU) data that is representative of a movement of the IOT device within the environment.

8. The server computer system of claim 1, the sensor data also including environmental data that is representative of the environment.

9. The server computer system of claim 1, the sensor data also including image data that digitally represents the location of the IOT device within the environment, and the MR service being further configured to:
use the image data to determine whether the location of the IOT device has changed by comparing the image data against location data of the IOT device included within a digital representation of the environment.

10. The server computer system of claim 9, the digital representation of the environment digitally representing semantically segmented objects located within the environment, and wherein the MR service is further configured to:
determine a relative proximity between the IOT device and one of the semantically segmented objects;

determine a probability that the relative proximity of the IOT device to the one of the semantically segmented objects will negatively impact a performance of the IOT device; and in response to determining that the probability exceeds a threshold limit indicating that the performance of the IOT device is below a performance threshold as a result of the relative proximity, send an alert to indicate that the IOT device should be moved to a new location.

11. A head-mounted device (HMD) comprising:

a wearable display, the HMD being configured to display virtual images on the wearable display and being configured to update the virtual images in response to unanticipated external stimuli;

one or more processor(s); and one or more computer-readable hardware storage device(s) having stored thereon computer-executable instructions that are executable by the one or more processor(s) to cause the HMD to perform at least the following while either (i) physically operating within a same environment as an internet-of-things (IOT) device or (ii) displaying a visualization of the environment in which the IOT device is located:

receive sensor data that was generated by the IOT device, the sensor data digitally representing one or more condition(s) monitored by the IOT device while the IOT device operates in the environment;

access a digital representation of the environment;

associate the sensor data with the digital representation of the environment, the sensor data being associated with a specific area in the environment, associating the sensor data with the digital representation includes associating the sensor data with a portion of the digital representation corresponding to the specific area;

in response to (i) determining the HMD is physically proximate to the specific area or (ii) determining a scene rendered by the HMD is visualizing the specific area, render a virtual image on the wearable display, the virtual image being representative of the sensor data such that the HMD displays a visualization corresponding to the one or more condition(s) monitored by the IOT device;

access a combined map that includes a first visualization reflecting a coverage map and a second visualization reflecting a sensor readings map, wherein:

the coverage map reflects a limited operational coverage area of the IOT device based on an identified layout of the environment, the limited operational coverage area being a reduced-in-size version of an initially-determined operational coverage area, the limited operational coverage area being generated as a result of imputing a size-reducing buffer against the initially-determined operational coverage area and being generated to increase a likelihood of determining a real-world coverage area of the IOT device, the limited operational coverage area starts at the IOT device and spans a determined distance away from the IO device in the environment, and the sensor readings map comprises the sensor data, the second visualization being structured to overlap at least a part of the first visualization in the combined map; and display the combined map on the wearable display.

12. The HMD of claim 11, the sensor data being received either (i) from a mixed-reality (MR) service operating in a cloud environment, the MR service receiving the sensor data prior to transmitting the sensor data to the HMD or (ii) from the IOT, which bypassed the MR service.

13. The HMD of claim 11, the sensor data being received in response to a change in location by the IOT device.

14. The HMD of claim 11, the HMD rendering a second virtual image representative of the limited operational coverage area of the IOT device.

15. The HMD of claim 11, the HMD scanning the IOT device to identify the IOT device within the environment.

16. The HMD of claim 15, wherein scanning the IOT device to identify the IOT device includes one or more of the following:

scanning an identifier affixed to the IOT device, the identifier then being used to identify the IOT device; or scanning the IOT device and then semantically segmenting the IOT device to identify the IOT device.

17. The HMD of claim 11, wherein execution of the computer-executable instructions further causes the HMD to:

receive a new location recommendation from a mixed-reality (MR) service operating in a cloud environment, the new location recommendation including data representative of an identification of a new location for the IOT device, and wherein the new location is selected based on a determination that a predicted performance of the IOT device will be higher at the new location as compared to a current performance of the IOT device at an existing location; and render a second virtual image identifying the new location.

18. A server computer system comprising:

one or more processor(s); and one or more computer-readable hardware storage device(s) having stored thereon computer-executable instructions that are executable by the one or more processor(s) to cause the server computer system to execute a mixed-reality (MR) service configured to perform at least the following:

receive, from an internet-of-things (IOT) device operating in an environment, sensor data digitally representing a first location of the IOT device within the environment;

in response to receiving the sensor data, determine that the IOT device has not changed position and refrain from updating a coverage map that digitally represents an operational coverage area of the IOT device within the environment;

receive, from the IOT device, new sensor data digitally representing a second location of the IOT device;

compare the new sensor data against the coverage map to determine that the IOT device has changed locations such that the second location is different from the first location;

update the coverage map to reflect that the IOT device is now located at the second location by determining a new operational coverage area of the IOT device with respect to the second location; and generate a combined map that includes a first visualization reflecting the coverage map and a second visualization reflecting a sensor readings map, wherein:

the sensor readings map comprises the sensor data, the second visualization is structured to overlap at least a part of the first visualization in the combined map, and the new operational coverage area is based on a limited operational coverage area that is a reduced-in-size version of an initially-determined operational coverage area for the second location, the limited operational coverage area being generated as a result of imputing a size-reducing buffer against the initially-determined operational coverage area and being generated to increase a likelihood of determining a real-world coverage area of the IOT device.

19. The server computer system of claim 18, the sensor data including one or more of:

image data corresponding to one or more image(s) of the environment; or signal strength data between the IOT device and another device located within the environment.

20. The server computer system of claim 18, the coverage map including a floor layout relative to the second location and including data representative of an identification of the IOT device at the second location relative to the floor layout.

* * * * *